(12) United States Patent
Takanashi et al.

(10) Patent No.: US 10,739,531 B2
(45) Date of Patent: Aug. 11, 2020

(54) CONNECTOR CLEANING TOOL

(71) Applicant: TOMOEGAWA CO., LTD., Tokyo (JP)

(72) Inventors: Mitsuyoshi Takanashi, Shizuoka (JP);
Nobuhiro Hashimoto, Tokyo (JP);
Yoshihiro Goto, Shizuoka (JP);
Masayoshi Suzuki, Shizuoka (JP);
Makoto Goto, Shizuoka (JP)

(73) Assignee: TOMOEGAWA CO., LTD., Tokyo (JP)

( * ) Notice: Subject to any disclaimer, the term of this patent is extended or adjusted under 35 U.S.C. 154(b) by 199 days.

(21) Appl. No.: 15/753,158

(22) PCT Filed: Sep. 14, 2016

(86) PCT No.: PCT/JP2016/077186
§ 371 (c)(1),
(2) Date: Feb. 15, 2018

(87) PCT Pub. No.: WO2017/051759
PCT Pub. Date: Mar. 30, 2017

(65) Prior Publication Data
US 2018/0231717 A1 Aug. 16, 2018

(30) Foreign Application Priority Data
Sep. 25, 2015 (JP) .................. 2015-188739

(51) Int. Cl.
*G02B 6/38* (2006.01)
*B08B 1/00* (2006.01)
*G02B 6/36* (2006.01)

(52) U.S. Cl.
CPC .............. *G02B 6/3866* (2013.01); *B08B 1/00* (2013.01); *B08B 1/001* (2013.01); *G02B 6/36* (2013.01); *B08B 2240/02* (2013.01)

(58) Field of Classification Search
CPC .......... G02B 6/3866; G02B 6/36; B08B 1/00; B08B 1/001; B08B 2240/02
See application file for complete search history.

(56) References Cited

U.S. PATENT DOCUMENTS

| 6,053,985 A * | 4/2000 | Cheswick | ............. B08B 7/0028 |
| | | | 134/42 |
| 2003/0039463 A1* | 2/2003 | Miyake | .................... G02B 6/25 |
| | | | 385/147 |

(Continued)

FOREIGN PATENT DOCUMENTS

| EP | 3272434 A1 | 1/2018 |
| JP | H03-105803 U | 11/1991 |

(Continued)

OTHER PUBLICATIONS

English Translation of the International Preliminary Report on Patentability for PCT/JP2016/077186.

(Continued)

*Primary Examiner* — Weilun Lo
(74) *Attorney, Agent, or Firm* — Muncy, Geissler, Olds & Lowe, P.C.

(57) ABSTRACT

To provide a connector cleaning tool capable of precisely removing dust even on an end surface of a connector having irregularities.

The connector cleaning tool includes a buffer body, and an adhesive body arranged with the buffer body, in which in a case where the connector cleaning tool is pressed toward a connection end surface of a connector on which a guide pin is protrudingly provided, the guide pin is inserted into the buffer body via the adhesive body.

14 Claims, 15 Drawing Sheets

(56) References Cited

U.S. PATENT DOCUMENTS

| | | | |
|---|---|---|---|
| 2004/0033050 A1* | 2/2004 | Lytle | B08B 3/02 385/147 |
| 2005/0013577 A1* | 1/2005 | Koide | G02B 6/3807 385/134 |
| 2005/0286853 A1* | 12/2005 | Fujiwara | B08B 1/00 385/134 |
| 2007/0289606 A1 | 12/2007 | Abrahamian | |
| 2013/0019423 A1 | 1/2013 | Srutkowski | |
| 2016/0349460 A1* | 12/2016 | Collier | G02B 6/3849 |

FOREIGN PATENT DOCUMENTS

| | | |
|---|---|---|
| JP | 05-186595 A | 7/1993 |
| JP | H08-101325 A | 4/1996 |
| JP | H09-285766 A | 11/1997 |
| JP | H10-197757 A | 7/1998 |
| JP | 3072645 U | 8/2000 |
| JP | 2002-219421 A | 8/2002 |
| JP | 2004-326054 A | 11/2004 |
| JP | 2006-221031 A | 8/2006 |
| WO | 2011/079254 A1 | 6/2011 |
| WO | 2015/017170 A1 | 2/2015 |
| WO | 2016/148226 A1 | 9/2016 |

OTHER PUBLICATIONS

Extended European search report of the corresponding EP application No. 16848547.2 dated Apr. 17, 2019.

* cited by examiner

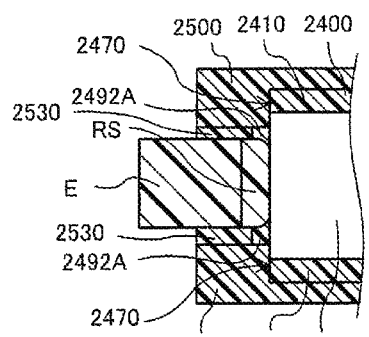
FIG. 12A
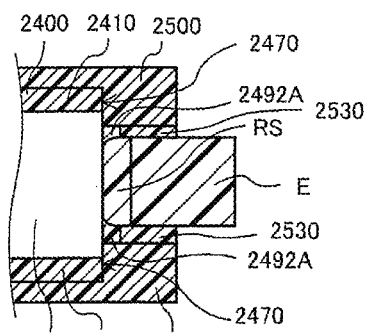
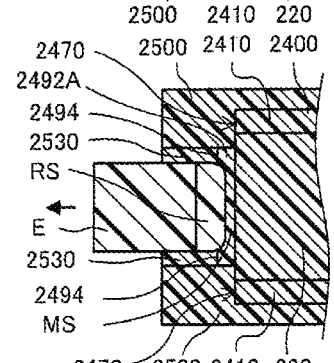
FIG. 12B
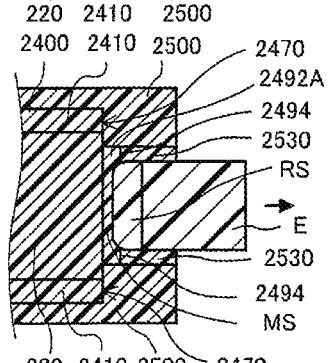
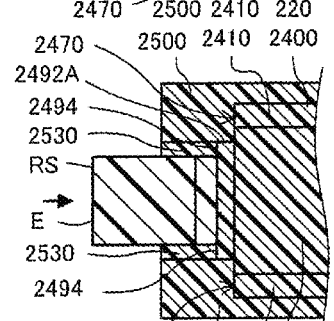
FIG. 12C
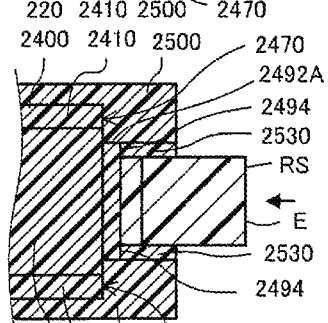
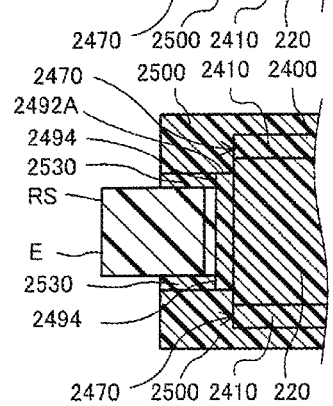
FIG. 12D
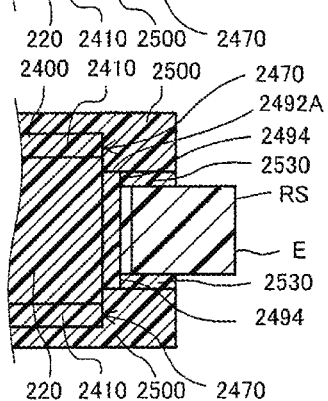

CONNECTOR CLEANING TOOL

TECHNICAL FIELD

The present invention relates to a cleaning tool for cleaning a connecting surface of a connector.

BACKGROUND ART

In a case where dust is present on an end surface of a ferrule of a connector such as an optical connector, the end surfaces cannot be brought into close contact with each other, leading to generation of a gap. The generation of the gap hinders appropriate (efficient) transmission of a signal such as a light ray because of air interposed between the end surfaces. To prevent this, various cleaning tools for cleaning the end surface of the ferrule have been devised.

For example, these includes a cleaning tool that performs cleaning by allowing a tape-like cleaning element to come in contact with a ferrule of a connector, and allowing the tape-like cleaning element to move from a supply reel to a take-up reel (refer to Patent Literatures 1 and 2, for example).

There is another cleaning tool that performs cleaning by allowing an elongated cleaning tool to abut an end surface of a ferrule of a connector (refer to Patent Literature 3, for example).

CITATION LIST

Patent Literature

Patent Literature 1: JP H08-101325 A
Patent Literature 2: JP H09-285766 A
Patent Literature 3: JP H10-197757 A

SUMMARY OF THE INVENTION

Technical Problem

There are cases where a protrusion such as a guide pin protrudes from the end surface of the ferrule of the connector. In these cases, the conventional cleaning method can move or send the dust to the end, but cannot sufficiently remove dust on the surroundings of a guide pin such as the root of the guide pin and the outside of the guide pin.

On the other hand, methods of cleaning by scrubbing a swab type or tape-like cleaning element might cause a scratch on the end surface of the ferrule.

Furthermore, a female connector is provided with a wall surface (adapter) surrounding on the end surface, which makes it difficult to insert a member for cleaning the end surface and to sufficiently clean the end surface.

The present invention has been made in view of the above issues, and it is an object of the present invention to provide a connector cleaning tool capable of precisely removing dust even on an end surface of a connector having irregularities.

Solution to Problem

A connector cleaning tool according to an embodiment of the present invention includes a buffer body and an adhesive body arranged with the buffer body, and in a case where the connector cleaning tool is pressed toward a connection end surface of the connector on which a guide pin is protrudingly provided, the guide pin is inserted into the buffer body via the adhesive body.

According to the configuration described above, in a case where the connector cleaning tool is pressed toward the connection end surface of the connector on which the guide pin is protrudingly provided, the guide pin is inserted into the buffer body via the adhesive body. This makes it possible to move the adhesive body to reach the connection end surface so as to come in contact with the connection end surface. By bringing the adhesive body into contact with the connection end surface, it is possible to attract the dust on the connection end surface with the adhesion of the adhesive body.

The connector cleaning tool according to an embodiment of the present invention is further characterized in that the connection end surface is housed in a housing having an opening, and the connector cleaning tool is configured to be inserted via the opening and to allow the buffer body and the adhesive body to move toward the connection end surface.

Even in a case where the connection end surface is housed in the housing, it is possible to bring the adhesive body into contact with the connection end surface and attract dust on the connection end surface with the adhesion of the adhesive body.

The connector cleaning tool according to an embodiment of the present invention is further characterized in that the connection end surface is an end surface for connecting an optical fiber.

Dust on the connection end surface can be removed by attracting the dust with the adhesion of the adhesive body, making it possible to efficiently transmit an optical signal.

The connector cleaning tool according to an embodiment of the present invention further includes a holding member configured to detachably hold the buffer body and the adhesive body.

Since the buffer body and the adhesive body are detachably held, it is possible to replace solely the buffer body and the adhesive body.

The connector cleaning tool according to an embodiment of the present invention further includes a holding member configured to integrally hold the buffer body and the adhesive body.

Since the buffer body and the adhesive body are integrally held, it is possible to simplify the configuration and to clarify that the entire connector cleaning tool is disposable.

The connector cleaning tool according to an embodiment of the present invention further includes a latch member that can be latched on the housing and that holds a state in which the adhesive body is in contact with the connection end surface when the latch member is latched on the housing.

Since the state in which the adhesive body is in contact with the connection end surface is held when the latch member is latched, it is possible to maintain a constant state of contact of an adhesive layer with the connection end surface regardless of the operator's degree of power adjustment, habit, proficiency, or the like, leading to stabilized removal of the dust.

The connector cleaning tool according to an embodiment of the present invention is characterized in that the buffer body has a Shore A hardness of 10 to 80.

Since the Shore A hardness is 10 to 80, it is possible to precisely pierce the buffer body by the guide pin and thereafter allow the buffer body to reach the root of the guide pin, leading to successful removal of the dust at the root of the guide pin.

Advantageous Effects of Invention

It is possible to precisely remove dust even on the end surface of the connector having irregularities.

BRIEF DESCRIPTION OF DRAWINGS

FIGS. 12A to 12D are views illustrating a process of attaching the cleaning tool 2100 to the female connector C.

DESCRIPTION OF EMBODIMENTS

First Embodiment

Figure 1:
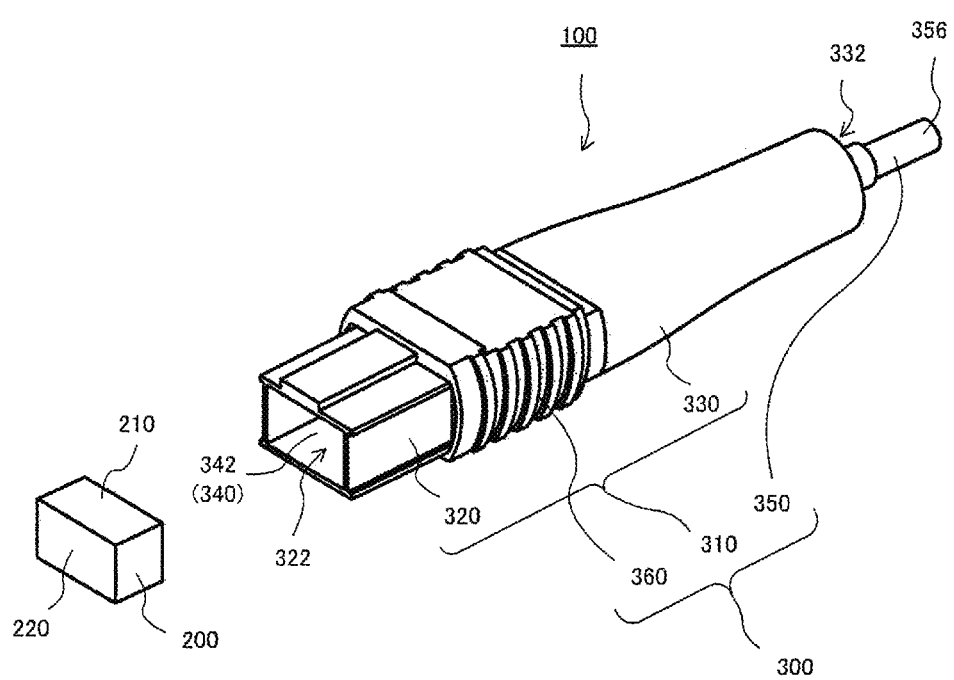
FIG. 1 is a perspective view illustrating an overview of a connector cleaning tool according to an embodiment of the present invention.

According to a first embodiment of the present invention, there is provided a connector cleaning tool having a buffer member (for example, a buffer body 210 described below) and an adhesive body (for example, an adhesive layer 220 described below) provided on the buffer body, and in case where the connector cleaning tool is pressed toward a connection end surface (for example, an end surface of a ferrule F described below) of a connector (for example, a connector C described below) on which a guide pin (for example, a guide pin P described below) is protrudingly provided, the guide pin is inserted into the buffer body via the adhesive body.

The connector cleaning tool has a buffer body and an adhesive body provided on the buffer body. A guide pin is protrudingly provided on the connection end surface of the connector, and in a case where the connector cleaning tool is pressed toward the connection end surface of the connector, the guide pin is inserted into the buffer body through the adhesive body.

A second embodiment of the present invention according to the first embodiment of the present invention is characterized in that the connection end surface is housed in a housing (for example, a female connector C described below) having an opening (for example, an opening N described below), and the connector cleaning tool is inserted from the opening and configured to allow the buffer body and the adhesive body to move toward the connection end surface.

Even in a case where the connection end surface is housed in the housing like the case of the female connector, it is possible to cause the adhesive body to reach and come into contact with the connection end surface and attract dust on the connection end surface with the adhesion of the adhesive body.

A third embodiment of the present invention according to the first or second embodiment of the present invention is characterized in that the connection end surface is configured to be an end surface for connecting an optical fiber (for example, an optical fiber O described below).

Since the dust on the connection end surface can be attracted and removed by the adhesion of the adhesive body, it is possible to efficiently transmit an optical signal without damaging the optical fiber connecting surface.

A fourth embodiment of the present invention according to the first to third embodiments of the present invention is characterized in that the connector cleaning tool further has a holding member configured to detachably hold the buffer body and the adhesive body.

Since the buffer body and the adhesive body are detachably held, it is possible to replace solely the buffer body and the adhesive body.

A fifth embodiment of the present invention according to the first to third embodiments of the present invention is characterized in that the connector cleaning tool further has a holding member configured to integrally hold the buffer body and the adhesive body.

Since the buffer body and the adhesive body are integrally held, it is possible to simplify the configuration and to clarify that the entire connector cleaning tool is disposable.

A sixth embodiment of the present invention according to the second embodiment of the present invention is characterized in that the connector cleaning tool further has a latch member (for example, a latch member 360 described below) that can be latched on the housing and that holds a state in which the adhesive body is in contact with the connection end surface when the latch member is latched on the housing.

A seventh embodiment of the present invention according to the first to sixth embodiments of the present invention is characterized in that the buffer body has a Shore A hardness of 10 to 80.

Since the Shore A hardness is 10 to 80, it is possible to precisely pierce the buffer body by the guide pin and thereafter allow the buffer body to reach the root of the guide pin, leading to successful removal of the dust at the root of the guide pin.

<<<Connector Cleaning Tool>>>

A connector cleaning tool 100 is a cleaning tool for cleaning a connection end surface of a connector, particularly a connection end surface of an optical connector. Specifically, the tool is a cleaning tool for removing dust attached to the connection end surface of the optical connector.

As illustrated in FIGS. 4A to 4D, the connection end surface of the connector C is the end surface of the ferrule F constituting the connector C. On the end surface of the ferrule F, end portions of a plurality of optical fibers O are provided so as to enable optical communication (refer to FIGS. 4 A to 4D). On the end surface of the ferrule F, two guide pins P perpendicularly protrude from the end surface of the ferrule F (refer to FIGS. 4 A to 4D).

As illustrated in FIG. 1, the connector cleaning tool 100 has a cleaning tip 200 and a tool main body 300. The cleaning tip 200 is detachably attached to the tool main body 300. The cleaning tip 200 has a buffer body 210 and an adhesive layer 220. As will be described in detail below, due to the adhesion of the adhesive layer 220, it is possible to remove the dust attached to the end surface of the ferrule F without being obstructed by the two guide pins P on the end surface of the ferrule F of the connector C.

<<Cleaning Tip 200>>

Figure 2:
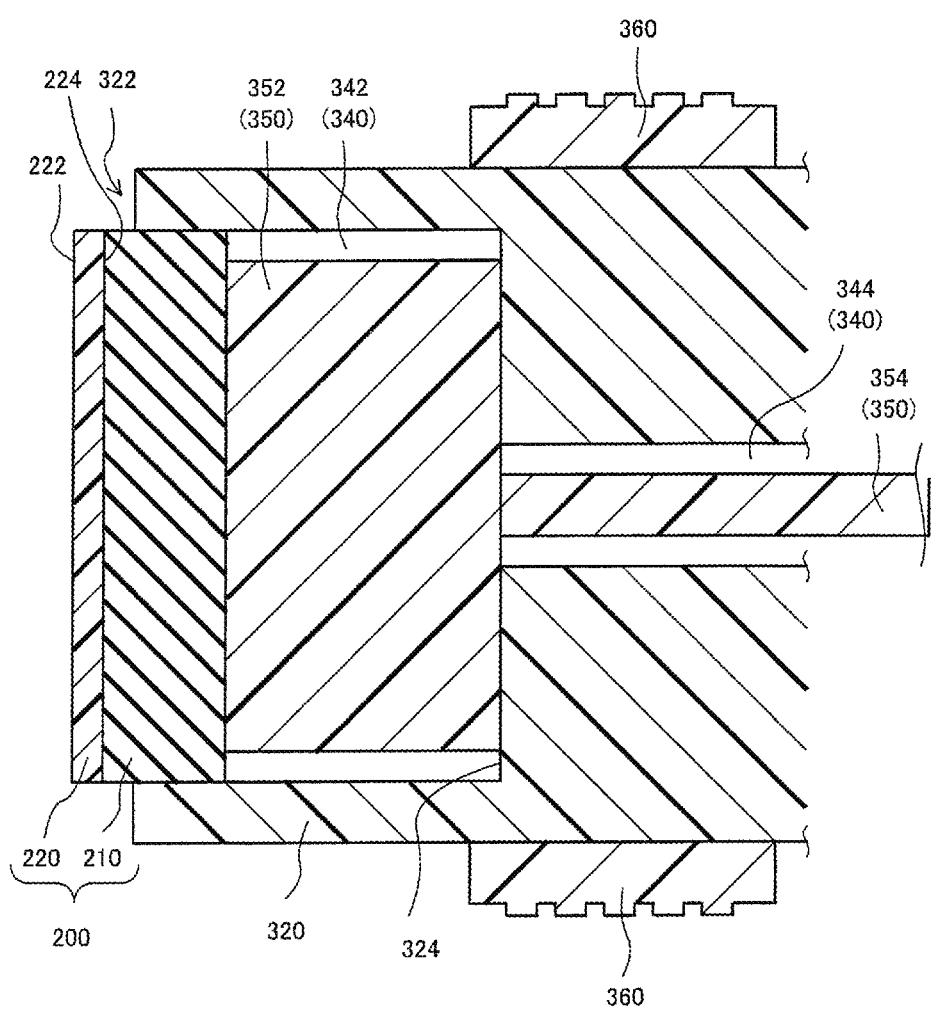
FIG. 2 is a cross-sectional view illustrating a cross section of a main body of the cleaning tool.

As illustrated in FIG. 2, the cleaning tip 200 includes the buffer body 210 and the adhesive layer 220.

<Buffer Body 210>

The buffer body 210 has a substantially rectangular parallelepiped shape formed with a lateral side, a longitudinal side, and a height (refer to FIG. 1). The lateral and longitudinal lengths and the shape of the buffer body 210 are formed to be approximately the same as the size and shape of the end surface of the ferrule F of the connector C. The height of the buffer body 210 is defined so as to allow the adhesive layer 220 to protrude from a holder 320.

The buffer body 210 has flexibility, predetermined hardness, and one of elasticity and plasticity. As described below, it is possible with the predetermined hardness to pierce the buffer body 210 by the two guide pins P. In the case of having elasticity, the adhesive layer 220 can be returned to its original shape by the elastic force so as to be brought into close contact with the end surface of the ferrule F. In the case of having plasticity, the guide pin P can be housed in the buffer body 210 with plastic deformation without deforming portions other than the pierced portion.

Any type of buffer body 210 may be used as long as the buffer body 210 can be pierced by the two guide pins P and the adhesive layer 220 can be brought into close contact with the end surface of the ferrule F by one of elastic deformation and plastic deformation. Examples of applicable buffer materials of the buffer body 210 include rubber, urethane, a silicone resin, a polyolefin resin, a polystyrene resin, and a polyester resin. The Shore A hardness of the buffer material may be 10 to 80, preferably 10 to 70, and more preferably 10 to 65. In a case where the Shore A hardness exceeds 80, piercing the buffer body 210 with a projection such as the guide pin P would be difficult because the buffer body 210 is too hard. On the other hand, in a case where it is less than 10, the buffer body 210 would be too soft to be able to remove the dust on the root of the projection such as the guide pin P.

<Adhesive Layer 220>

The adhesive layer 220 has flexibility and is formed to have a substantially film-like shape, including a first surface 222 and a second surface 224 opposed to each other. The lateral and longitudinal lengths of the adhesive layer 220 are formed to be approximately the same as the size of the end surface of the ferrule F, and are substantially the same as the lateral and longitudinal lengths of the buffer body 210. The thickness of the adhesive layer 220 is 30 μm to 1000 μm, and preferably 50 μm to 700 μm. While the thickness of the adhesive layer 220 can be appropriately determined depending on the material of the adhesive layer 220, the type of dust, or the like, using the thickness of less than 30 μm might cause a problem in handling the material at the time of manufacture, and in addition, cause a problem of low cohesion of the adhesive layer 220, leading to a high possibility of breakage of the adhesive layer 220 by being caught on the guide pin P, for example, when the cleaning tool is extracted after cleaning. On the other hand, the thickness exceeding 1000 μm would increase the material cost of the adhesive material although this might cause no problem in use.

An adhesive member is arranged to each of the surfaces of a first surface 222 and a second surface 224 of the adhesive layer 220. The first surface 222 is a surface coming in contact with the end surface of the ferrule F to remove dust on the end surface of the ferrule F. The second surface 224 is a surface for bonding the adhesive layer 220 to the buffer body 210. The adhesive layer 220 is attached to the buffer body 210 on the second surface 224 so as to be integrated with the buffer body 210. The buffer body 210 and the adhesive layer 220 have flexibility, and the adhesive layer 220 can be brought into close contact with and adhered to the buffer body 210 on the second surface 224.

The cleaning tip 200 is configured in a state in which the adhesive layer 220 is integrated with the buffer body 210. The cleaning tip 200 has a detachable configuration which can be attached to or detached from the tool main body 300.

Preferably, the adhesive applied to the adhesive layer 220 according to the present invention may be a UV adhesive having high cohesion and tackiness.

Examples of such UV adhesives include those forming with an elastic polymer, an ultraviolet cross-linked resin, a polymerization initiator, and a polymerization inhibitor. Examples of the elastic polymer include acrylic resin type adhesives, saturated polyester resins, and polyurethane resins. Among them, acrylic resin type adhesives are preferable. Examples of the acrylic resin type adhesives include a copolymer of an acrylic acid ester monomer and another copolymerizable monomer. The copolymer of an acrylic acid ester monomer and another copolymerizable monomer may be obtained by polymerizing the above-described acrylic acid ester monomer capable of forming a polymer having a low glass transition point as a main monomer, and a monomer capable of forming a hard polymer having a high glass transition point and a monomer having a functional group such as a carboxylic acid group, an amide group, a glycidyl group, a hydroxyl group as the above-mentioned other copolymerizable monomer. The acrylic acid ester monomer capable of forming a polymer having a low glass transition point brings adhesiveness to the copolymer. The monomer capable of forming a hard polymer having a high glass transition point brings cohesiveness to the copolymer. The monomer having a functional group such as a carboxylic acid group, an amide group, a glycidyl group, a hydroxyl group improves cross-linking property and bond strength.

Examples of the above-described acrylic acid ester monomer include acrylic acid alkyl esters. Acrylic acid alkyl esters include ethyl acrylate, butyl acrylate, and 2-ethylhexyl acrylate.

Examples of monomers capable of forming a hard polymer having a high glass transition point include vinyl acetate, acrylonitrile, styrene, methyl acrylate, and methyl methacrylate. Examples of the monomer having a functional group such as a carboxylic acid group, an amide group, a glycidyl group, a hydroxyl group include acrylic acid, methacrylic acid, itaconic acid, hydroxylethyl methacrylate, hydroxylpropyl methacrylate, acrylamide, and glycidyl methacrylate.

Examples of the above-described ultraviolet cross-linkable resin include an acrylic acid ester or a methacrylic acid ester as an oligomer or a monomer that crosslinks upon irradiation with ultraviolet rays in a specific wavelength range. These esters preferably may have at least two acryloyl groups or methacryloyl groups within the molecule.

Examples of the above-mentioned oligomer include oligoester acrylate. Examples of the above-described monomers include an ester of a polyhydric alcohol with acrylic acid such as 1,6-hexanediol acrylate, trimethylolpropane triacrylate, tetramethylolmethane tetraacrylate, and dipentaerythritol hexaacrylate, and an ester of a polyhydric alcohol with methacrylic acid such as 1,6-hexanediol dimethacrylate, trimethylolpropane trimethacrylate, tetramethylolmethane tetramethacrylate, and dipentaerythritol hexamethacrylate. Other than these, urethane acrylate, epoxy acrylate, or the like, can be included.

In order to prepare the UV adhesive, the ultraviolet cross-linkable resin is blended in an amount of 0.5 to 50 parts by weight, and preferably 0.5 to 10 parts by weight, based on 100 parts by weight of the elastic polymer. In a case where the amount is less than 0.5 parts by weight, the bond strength of the UV adhesive might not be substantially changed before and after irradiation with ultraviolet rays. On the other hand, the amount exceeding 50 parts by weight would induce excessive hardening of the UV adhesive after ultraviolet irradiation, and leading to lowered adhesion.

The polymerization initiator is used for promoting cross-linking of the ultraviolet cross-linkable resin by ultraviolet irradiation. In the present invention, a conventionally known polymerization initiator is applicable. Examples of these polymerization initiators include benzoin alkyl ethers such as benzoin methyl ether and benzoin propyl ether, aromatic oxyketones or aromatic ketones such as benzoin, benzyl and benzophenone, benzyl dimethyl ketal, and polyvinyl benzophenone.

The blending amount of the polymerization initiator is 0.1 to 20 parts by weight, and preferably 0.5 to 10 parts by weight based on 100 parts by weight of the elastic polymer. The amount less than 0.1 parts by weight would not promote cross-linking of the ultraviolet cross-linkable resin even when irradiated with ultraviolet rays, leading to a small degree of a decrease in the bond strength. On the other hand, the amount exceeding 20 parts by weight would not increase the effect as a polymerization initiator so much, leading to low economic efficiency.

The above-described adhesive preferably has a gel fraction of 60% or more, and more preferably 85% or more. The degree of cross-linking relates to the cohesion of the adhesive at room temperature or high temperature. The gel fraction of less than 60% would increase the fluidity and might split the adhesive layer 220 to cause adhesive residue on the end surface of the ferrule F and the guide pin P.

Note that the gel fraction can be calculated by the following formula after the procedures using an organic solvent such as ethyl acetate as a solvent, allowing the adhesive to be immersed in the solvent to swell at a temperature of 30° C., and filtering the insoluble fraction in a 200 mesh net, drying the solvent, and measuring its weight.

Gel fraction (%)=(dry weight of filtration portion after solvent immersion/weight before solvent immersion)×100

<<Tool Main Body 300>>

As illustrated in FIG. 1, the tool main body 300 has a casing 310, a movable body 350, and a latch member 360.

<Casing 310>

The casing 310 has an elongated cylindrical hollow shape. The casing 310 has the holder 320 and a support 330. A through hole 340 (refer to FIG. 2) is formed in the holder 320 and the support 330. The through hole 340 includes a through hole 342 inside the holder 320 and a through hole 344 inside the support 330. The holder 320 and the support 330 communicate with each other by the through hole 340. The through hole 340 is formed inside the casing 310 along the longitudinal direction of the casing 310.

As illustrated in FIGS. 1 and 2, the holder 320 has a substantially rectangular tubular shape and has a first opening 322. As illustrated in FIG. 1, the support 330 has a substantially cylindrical shape and has a second opening 332. The holder 320 and the support 330 are integrally formed to constitute the casing 310. The through hole 340 is a hole extending from the first opening 322 of the holder 320 to the second opening 332 of the support 330.

<Holder 320>

As will be described below, the cleaning tip 200 (buffer body 210 and adhesive layer 220) is detachably attached to the holder 320. As described above, the adhesive layer 220 and the buffer body 210 are integrally formed beforehand to form the cleaning tip 200.

As illustrated in FIG. 1, the first opening 322 of the holder 320 has a substantially rectangular shape. The first opening 322 is formed to be slightly smaller than the lateral and longitudinal lengths of the buffer body 210. Therefore, the cleaning tip 200 can be held within the holder 320 by fitting the buffer body 210 into the first opening 322 of the holder 320.

The cleaning tip 200 is fitted into and held within the holder 320 so as to allow the adhesive layer 220 to protrude and be exposed from the holder 320.

A locking wall 324 is formed in the holder 320. The locking wall 324 is a wall surface that locks a locking body 352 when the movable body 350 moves to the second opening 332. By locking the locking body 352 with the locking wall 324, it is possible to maintain a state in which the adhesive layer 220 protrudes from the holder 320 and is exposed.

<Support 330>

As illustrated in FIG. 1, the support 330 has a substantially cylindrical shape. The support part 330 is a portion held by the cleaning operator with fingers when the operator attaches the tool main body 300 to the connector C (refer to FIGS. 5A to 5B).

<Movable Body 350>

As illustrated in FIG. 2, the movable body 350 has the locking body 352 and an operation rod 354 coupled to the locking body 352. The operation rod 354 has an elongated shape and enables a cleaning operator to operate the operation rod 354 with one's fingers.

As described above, the holder 320 has a substantially rectangular tubular shape. The locking body 352 is configured to be able to reciprocate in the through hole 340 of the holder 320. Moreover, the support 330 has a substantially cylindrical shape. The operation rod 354 is configured to be able to reciprocate in the through hole 340 of the support 330. The end portion 356 of the operation rod 354 protrudes from the second opening 332 of the support 330.

When the cleaning operator pushes the end portion 356 of the operation rod 354 toward the first opening 322, the operation rod 354 moves and allows the locking body 352 coupled to the operation rod 354 to move toward the first opening 322. This causes the locking body 352 to push out the cleaning tip 200 from the holder 320, enabling the cleaning tip 200 to be detached from the tool main body 300.

<<Attaching and Detaching Cleaning Tip 200>>

Figure 3A:
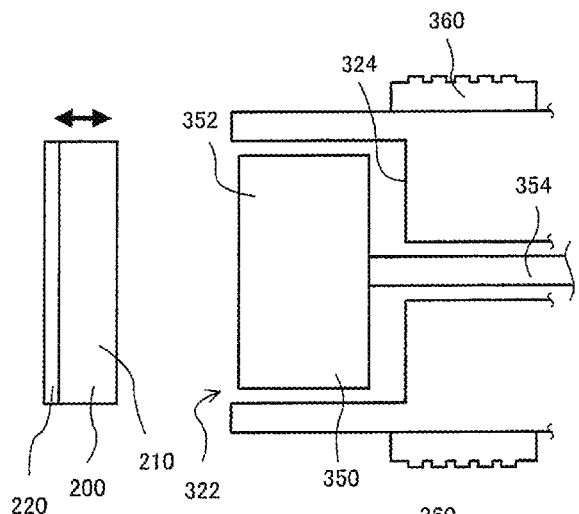
FIGS. 3A to 3C are cross-sectional views illustrating a process of attaching a cleaning tip to a casing.
Figure 3B:
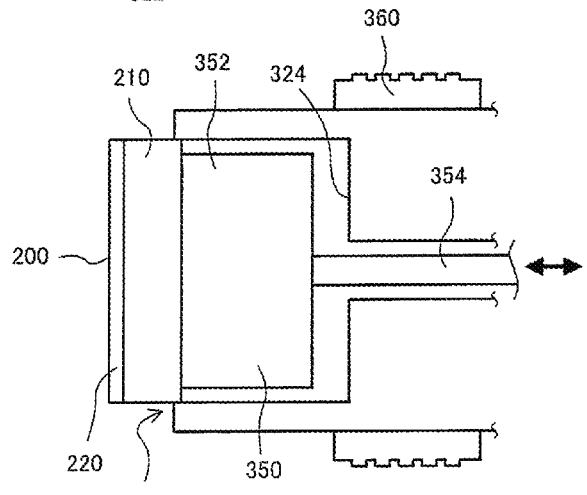

FIGS. 3A to 3B are cross-sectional views illustrating a process of attaching or detaching the cleaning tip 200 to or from the casing 310.

<Attaching Cleaning Tip 200>

As illustrated in FIG. 3A, the buffer body 210 of the cleaning tip 200 is fitted from the first opening 322 of the holder 320 so as to allow the adhesive layer 220 of the cleaning tip 200 to face outward (direction to be spaced apart from the tool main body 300).

Figure 3C:
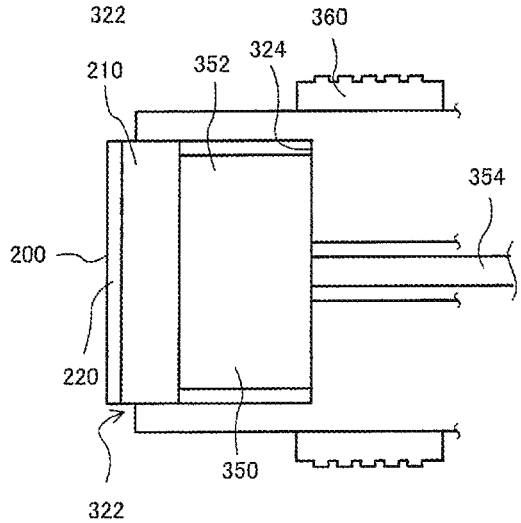

When the buffer body 210 is fitted into the holder 320, the buffer body 210 abuts the locking body 352 of the movable body 350 as illustrated in FIG. 3B. By further pressing the buffer body 210 toward the inside of the holder 320, the entire movable body 350 is moved toward the second opening 332 (refer to FIG. 1), allowing the buffer body 210 to be fitted into the holder 320 as illustrated in FIG. 3C. In this manner, the cleaning tip 200 is attached to the holder 320 and held within the casing 310.

<Detaching Cleaning Tip 200>

Meanwhile, the cleaning tip 200 can be detached by a reversed procedure. Specifically, in a state illustrated in FIG. 3C, the operator moves the end portion 356 of the operation rod 354 toward the first opening 322, whereby the locking body 352 extrudes the buffer body 210 from the holder 320 as illustrated in FIG. 3B. By further moving the operation rod 354 toward the first opening 322, the cleaning tip 200 can be detached from the holder 320, that is, from the casing 310, as illustrated in FIG. 3A.

<<Cleaning Process>>

FIGS. 4A to 4D are cross-sectional views illustrating a process of cleaning an end surface of the ferrule F with the connector cleaning tool 100. FIGS. 4A to 4D diagrams illustrating a positional relationship between the end surface of the ferrule F and the cleaning tip 200. As illustrated in FIGS. 4A to 4D, end portions of twelve optical fibers O are arranged side by side on the ferrule F. The ferrule F are provided with the two guide pins P sandwiching the twelve optical fibers O. The two guide pins P perpendicularly protrude from the end surface of the ferrule F.

Figure 5A:
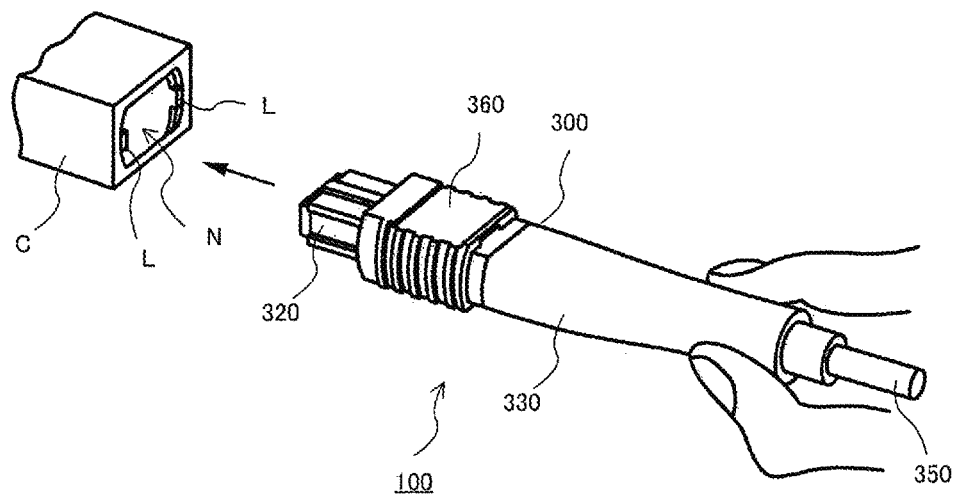
FIGS. 5A and 5B are perspective views illustrating a process of cleaning operation.
Figure 5B:
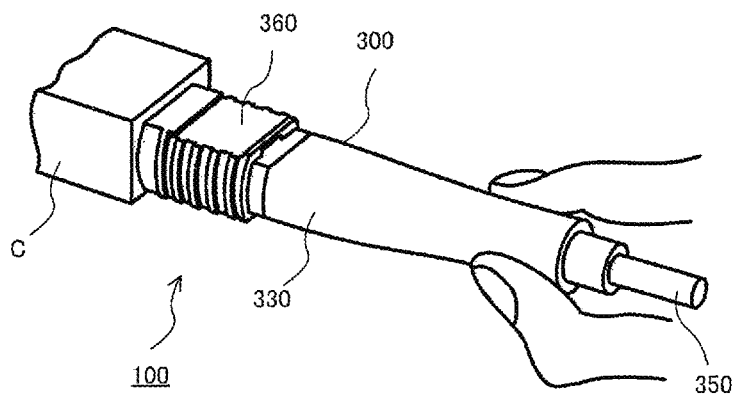

As illustrated in FIGS. 5A to 5B, cleaning operation is performed by the operator attaching the connector cleaning tool 100 to a female connector C. In the female connector C, the end surface of the ferrule F is surrounded by the wall surface of the connector C and is arranged at a position deep from an opening N.

First, as illustrated in FIG. 5A, an operator holds the support 330 with fingers and brings the holder 320 of the connector cleaning tool 100 closer to the opening N of the female connector C. Next, as illustrated in FIG. 5B, the holder 320 is inserted into the opening N of the female connector C, and the connector cleaning tool 100 is latched to the female connector C by the latch member 360. By latching the connector cleaning tool 100 to the female connector C, the adhesive layer 220 of the cleaning tip 200 can be brought into close contact with the end surface of the ferrule F.

The specific process will be described below.

Figure 4A:
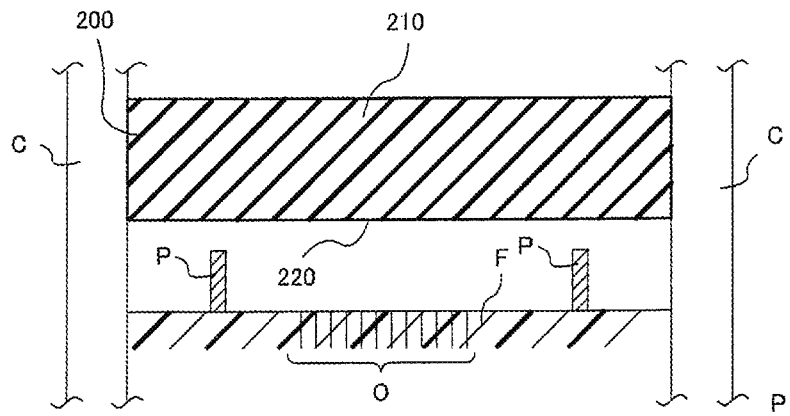
FIGS. 4A to 4D are cross-sectional views illustrating a process of cleaning an end surface of a ferrule with a connector cleaning tool.

As illustrated in FIG. 4A, when the operator inserts the holder 320 into the opening N of the female connector C, the adhesive layer 220 of the cleaning tip 200 faces the end surface of the ferrule F at a position spaced apart from the end surface of the ferrule F.

Figure 4B:
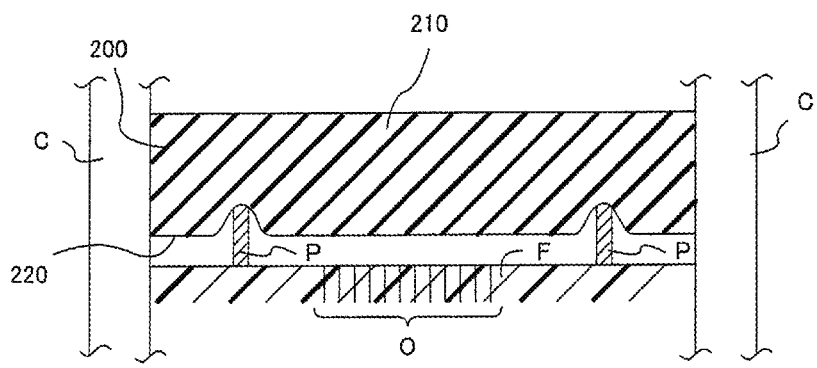

Furthermore, when the operator pushes the support 330 toward the female connector C, the adhesive layer 220 of the cleaning tip 200 approaches the end surface of the ferrule F as illustrated in FIG. 4B. In the state illustrated in FIG. 4B, the cleaning tip 200 comes into contact with the tip end portions of the two guide pins P of the ferrule F and is pressed by the two guide pins P so as to be elastically deformed. In this state, the cleaning tip 200 is elastically deformed and the adhesive layer 220 is in a state of being in contact with solely the tip end portions of the two guide pins P.

Figure 4C:
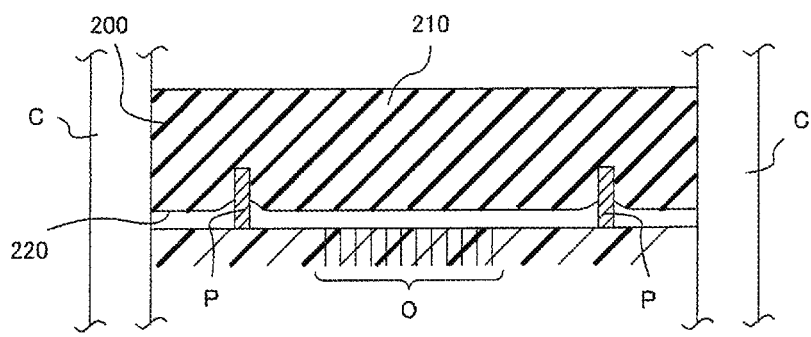

Next, when the operator presses the support 330 by applying force, the cleaning tip 200 (buffer body 210 and adhesive layer 220) is pierced by the two guide pins P, with the two guide pins P being inserted into the buffer body 210 as illustrated in FIG. 4C. By controlling the hardness of the buffer body 210 within an appropriate range, it is possible to prevent or reduce the elastic deformation of the buffer body 210 and to pierce the buffer body 210 and the adhesive layer 220 with the two guide pins P.

Figure 4D:
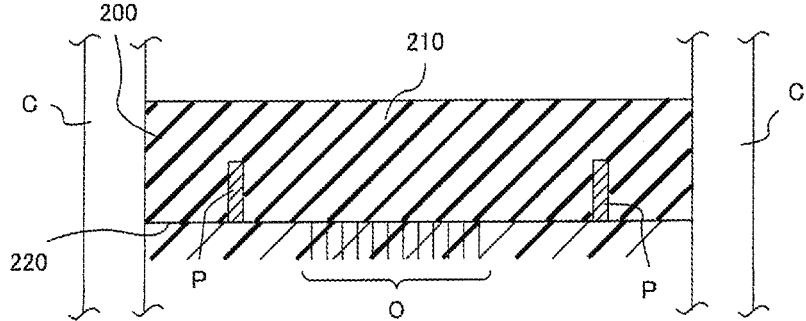

Next, when the operator further applies force to the support 330, the cleaning tip 200 reaches the end surface of the ferrule F as illustrated in FIG. 4D. At this time, the portion elastically deformed by the contact of the two guide pins P returns to its original shape due to the elastic force of the buffer body 210. By enabling the buffer body 210 to return to its original rectangular parallelepiped shape with the elastic force, it is possible to allow the adhesive layer 220 to be brought into close contact with the entire end surface of the ferrule F without generating a gap between the adhesive layer 220 and the end surface of the ferrule F. By bringing the adhesive layer 220 into close contact with the end surface of the ferrule F, the adhesive layer 220 can be adhered to the root of the two guide pins P, making it possible to attract the dust on the end surface of the ferrule F with the adhesion of the adhesive layer 220. The dust adheres to the end surface of the ferrule F with electrostatic force, or the like. It is possible to also remove dust adhering to the surroundings of the two guide pins P and the outside of the two guide pins P with the adhesion of the adhesive layer 220.

Note that the state of FIG. 4D is a state in which the latch member 360 of the tool main body 300 is latched with a latched member L (refer to FIG. 5A) of the female connector C, being the state illustrated in FIG. 5B. By latching with the female connector C, the state of FIG. 4D can be reproduced by any operator. That is, the adhesive layer 220 can constantly be brought into close contact with the entire end surface of the ferrule F regardless of the operator's degree of power adjustment, habit, proficiency, or the like. The contact state of the adhesive layer 220 with the end surface of the ferrule F can be made constant by any operator and dust can be stably removed regardless of conditions on the operator.

While FIGS. 4A to 4D illustrates a process in which the buffer body 210 is elastically deformed and pierced by the two guide pins P, it is also allowable to cause the buffer body 210 to be plastically deformed by the two guide pins P. FIGS. 6A to 6D are views illustrating an example of a case where the buffer body 210 is plastically deformed. Whether the buffer body 210 is elastically deformed to be pierced or plastically deformed to be pierced may be selected by appropriately determining the shore A hardness of the buffer body 210, or the like.

Figure 6A:
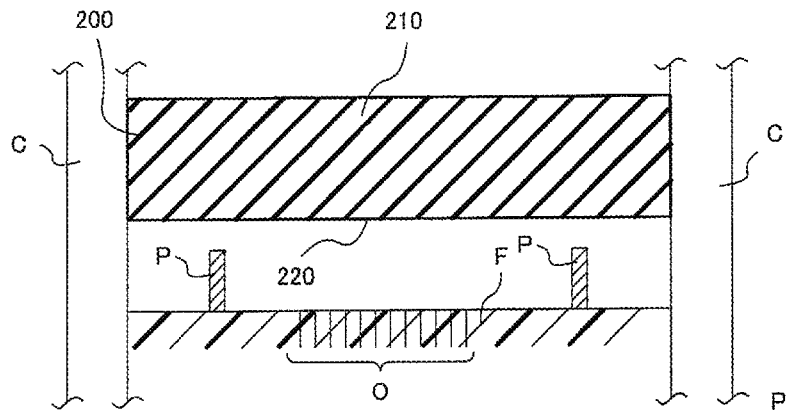
FIGS. 6A to 6D cross-sectional views illustrating a process of cleaning an end surface of a ferrule with a connector cleaning tool.
Figure 6B:
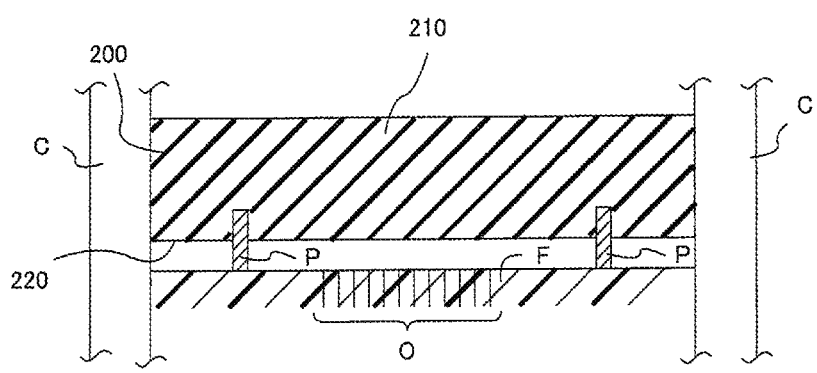
Figure 6C:
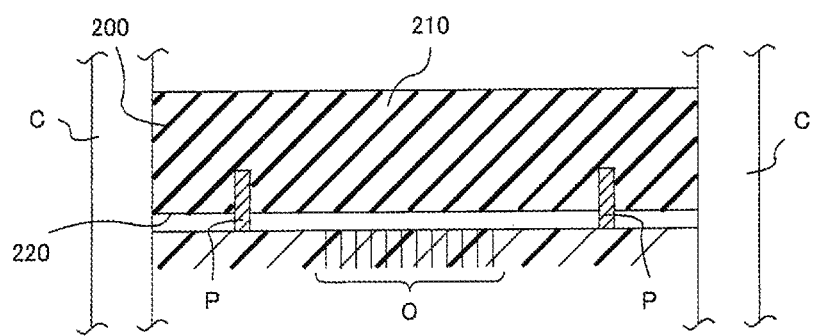
Figure 6D:
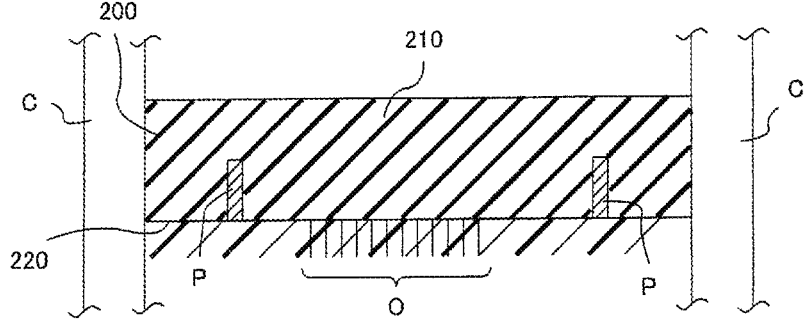
Figure 7A:
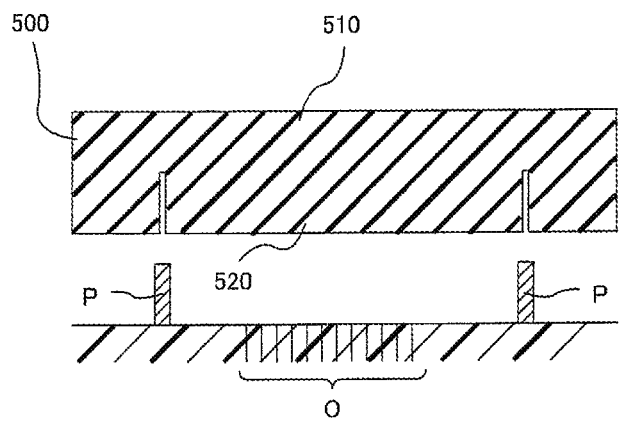
FIGS. 7A to 7C are cross-sectional views illustrating a process of attaching a cleaning tip of another aspect to a casing.
Figure 7B:
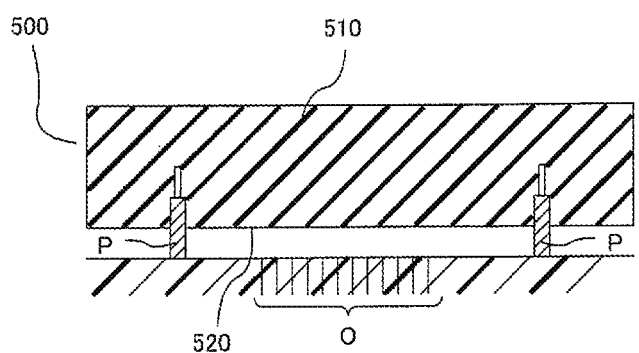
Figure 7C:
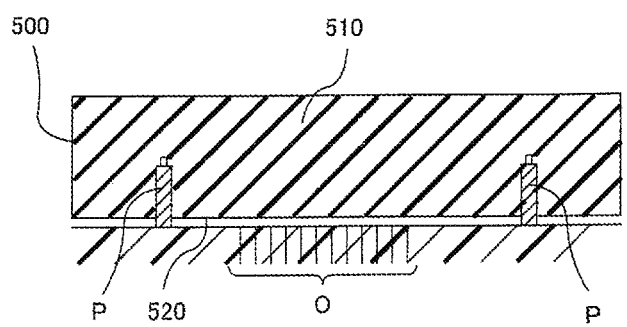

FIG. 6A illustrates the same state as FIG. 4A. As illustrated in FIG. 6B, when the two guide pins P are brought into contact with and pressed by the cleaning tip 200 (buffer body 210 and adhesive layer 220), the buffer body 210 is plastically deformed by the two guide pins P, starting the piercing at an initial stage of the contact with the two guide pins P. Next, pushing in the cleaning tip 200 further promotes plastic deformation as illustrated in FIG. 6C, with the two guide pins P gradually piercing into the buffer body 210. Finally, as illustrated in FIG. 6D, the cleaning tip 200 reaches the end surface of the ferrule F while the buffer body 210 plastically deforms. In this manner, even in a case where the buffer body 210 is plastically deformed, the adhesive layer 220 of the cleaning tip 200 can be attached to the roots of the two guide pins P.

<<Other Aspect 1>>

The above-described embodiment is a case where the buffer body 210 and the adhesive layer 220 are pierced by the two guide pins P without forming the holes corresponding to the two guide pins P in the buffer body 210 and the adhesive layer 220. There is no limitation, however, and it is allowable to use a cleaning tip 500 (a buffer body 510 and an adhesive layer 520) in which holes are formed beforehand according to the thickness, the length, and the position of the two guide pins P.

In this case, as illustrated in FIGS. 7A to 7D, it is possible to bring the adhesive layer 520 into close contact with the end surface of the ferrule F in the process of attaching the cleaning tip 500 (buffer body 510 and adhesive layer 520) without generation of elastic deformation of the cleaning tip 500 and piercing by the two guide pins P. By forming the holes corresponding to the two guide pins P in the cleaning tip 500 beforehand, it is possible to apply various materials to the buffer body 510 without a need to consider cancellation of the elastic deformation and easiness of piercing.

<<Other Aspect 2>>

While the above-described embodiment is a case where the cleaning tip 200 is detachable from the tool main body 300, the cleaning tip may be integrally formed with the tool main body or the like. This makes it possible to simplify the configuration and to clarify that the cleaning tool is disposable, enabling evoking an alert for replacement with a new cleaning tool and constant use of a clean cleaning tip.

EXAMPLES AND REFERENCE EXAMPLES

<Preparation of Adhesive A>

The following adhesive A was used for the adhesive layer 220.

Elastic Polymer 100 parts by weight of LKG-2102 manufactured by Fujikura Kasei Co., Ltd.

Ultraviolet cross-linked resin 1 part by weight of A-HD-N manufactured by Shin-Nakamura Chemical Co., Ltd.

Polymerization initiator 1 part by weight of IRGACURE 184 manufactured by BASF Co.

With this composition, the adhesive layer 220 was formed on the buffer body 210. The gel fraction of the adhesive A was 95.

<Preparation of Adhesive B>

The product of DIC Corporation (product name: FINETACK Exp. U 14500) was used as the adhesive B for the adhesive layer 220. This is pre-mixed with an elastic polymer, an ultraviolet cross-linked resin, and a polymerization initiator. The gel fraction of the adhesive B was 46.

Examples and Reference Examples 1 to 6 were prepared as illustrated in Table 1.

TABLE 1

| | ADHESIVE USED | THICKNESS OF ADHESIVE LAYER [μm] | MATERIAL OF BUFFER BODY | SHORE A HARDNESS OF BUFFER BODY |
|---|---|---|---|---|
| EXAMPLE 1 | A | 150 | POLYURETHANE | 20 |
| EXAMPLE 2 | A | 300 | POLYURETHANE | 20 |
| EXAMPLE 3 | A | 500 | POLYURETHANE | 20 |
| EXAMPLE 4 | A | 1000 | POLYURETHANE | 20 |
| EXAMPLE 5 | A | 500 | POLYURETHANE | 40 |
| EXAMPLE 6 | A | 700 | POLYURETHANE | 40 |
| EXAMPLE 7 | A | 300 | POLYSTYRENE | 65 |
| EXAMPLE 8 | A | 500 | POLYSTYRENE | 65 |
| EXAMPLE 9 | A | 700 | POLYSTYRENE | 65 |
| REFERENCE EXAMPLE 1 | A | 300 | POLYSTYRENE | 84 |
| REFERENCE EXAMPLE 2 | A | 500 | POLYSTYRENE | 84 |
| REFERENCE EXAMPLE 3 | B | 300 | POLYSTYRENE | 65 |
| REFERENCE EXAMPLE 4 | B | 500 | POLYSTYRENE | 65 |
| REFERENCE EXAMPLE 5 | B | 700 | POLYSTYRENE | 65 |
| REFERENCE EXAMPLE 6 | A | 20 | POLYSTYRENE | 65 |

In addition to the above, NEO CLEAN-M manufactured by NTT-AT Corporation was used as a cleaning tool of Reference Example 7, and MPO CLEANER manufactured by Fujikura Ltd. was used as a cleaning tool of Reference Example 8.

After cleaning the MPO adapter, evaluation was performed for the above-described Examples and Reference Examples. The tool used in evaluation was the one with a guide pin P attached to the connection end surface of the adapter (female) side. Evaluation items (four) include: 1) Inside the guide pin P (for example, between the two guide pins P in FIG. 4A), 2) Outside the guide pin P (for example, between the guide pin P and the adapter C in FIG. 4A), 3) Around the guide pin P (around the root of the guide pin P), for the end surface of the ferrule F; and 4) Adhesive residue (end surface of the ferrule F or guide pin P). For items 1) to 3), the cases where dust removal was successful were marked with "○", the cases where dust removal was not completely successful were marked with "Δ", and the cases where dust removal was unsuccessful were marked with "x". For item 4), the cases where no adhesive residue present on the end surface of the ferrule F and the guide pin P were marked with "○", the cases where adhesive residue present on either of two portions were marked with "Δ", and the cases where adhesive residue present on both of the two portions were marked with "x". Table 2 illustrates an evaluation result.

TABLE 2

|  | CLEANING INSIDE PIN | CLEANING OUTSIDE PIN | CLEANING AROUND PIN | ADHESIVE RESIDUE |
|---|---|---|---|---|
| EXAMPLE 1 | O | O | O | O |
| EXAMPLE 2 | O | O | O | O |
| EXAMPLE 3 | O | O | O | O |
| EXAMPLE 4 | O | O | O | O |
| EXAMPLE 5 | O | O | O | O |
| EXAMPLE 6 | O | O | O | O |
| EXAMPLE 7 | O | O | O | O |
| EXAMPLE 8 | O | O | O | O |
| EXAMPLE 9 | O | O | O | O |
| REFERENCE EXAMPLE 1 | X | X | X | X |
| REFERENCE EXAMPLE 2 | X | X | X | X |
| REFERENCE EXAMPLE 3 | O | O | O | X |
| REFERENCE EXAMPLE 4 | O | O | O | X |
| REFERENCE EXAMPLE 5 | O | O | O | X |
| REFERENCE EXAMPLE 6 | O | O | O | X |
| REFERENCE EXAMPLE 7 | O | X | Δ | O |
| REFERENCE EXAMPLE 8 | O | X | Δ | O |

As illustrated above, better results were obtained in each of Examples 1 to 9 compared with Reference Examples 1 to 8.

Second Embodiment

In the above-described cleaning tool 100 according to the first embodiment, the holder 320 to which the cleaning tip 200 is attached has a substantially rectangular tubular shape, and the first opening 322 of the holder 320 has a substantially rectangular shape. Therefore, the cleaning tool 100 can surroundingly support the cleaning tip 200. In addition, the cleaning tool 100 has a mechanism of detaching the cleaning tip 200 attached to the holder 320 from the cleaning tool 100 by operating the movable body 350. Furthermore, the cleaning tool 100 is latched to the female connector C by the latch member 360.

A cleaning tool 2100 according to a second embodiment has a simpler structure than the cleaning tool 100 and facilitates attachment and detachment of the cleaning tip 200. Note that the cleaning tip 200 has a similar structure and function in the cleaning tool 2100 according to the second embodiment and will be described with the same reference numerals.

<<<Configuration of Cleaning Tool 2100>>>

Figure 8:
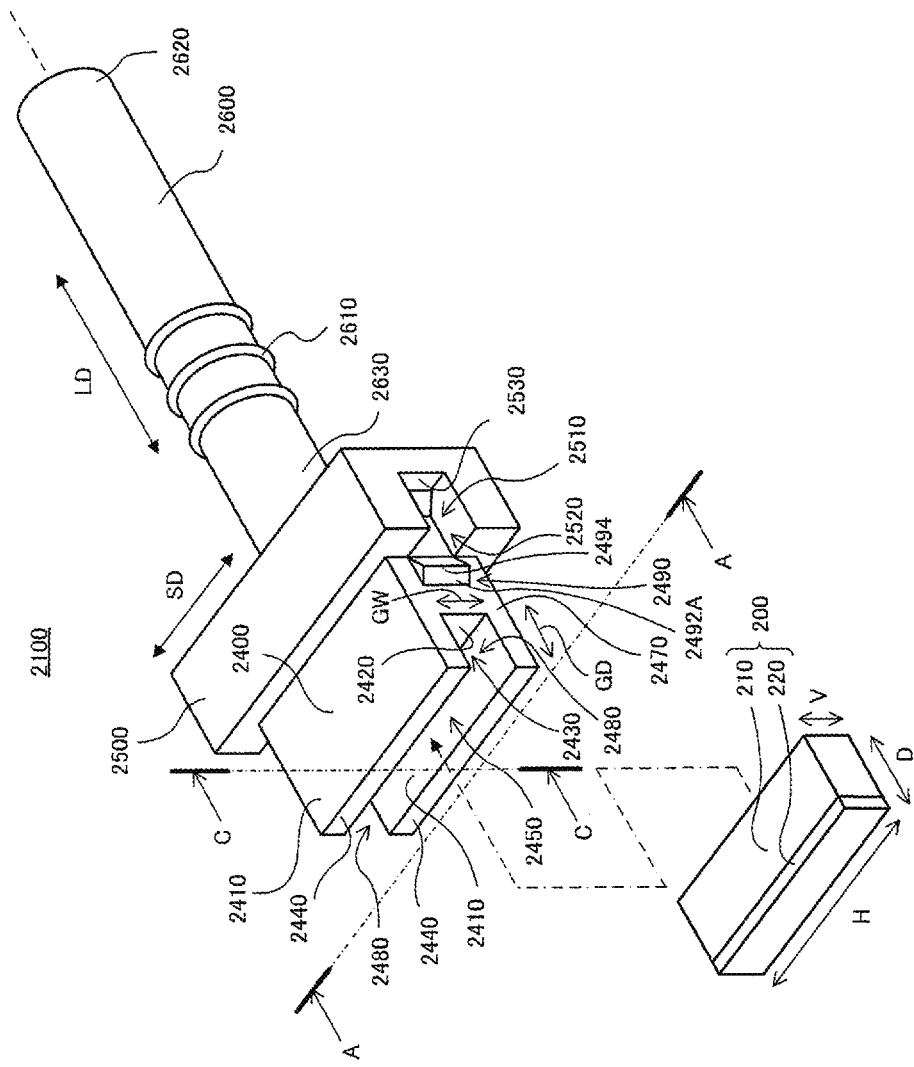
FIG. 8 is a perspective view illustrating an entire configuration of a cleaning tool 2100 according to a second embodiment.

FIG. 8 is a perspective view illustrating an entire configuration of the cleaning tool 2100 according to the second embodiment. The cleaning tool 2100 includes a holder 2400, a latch member 2500, and an operating portion 2600. The cleaning tool 2100 is substantially T-shaped as a whole and has an elongated shape. The operating portion 2600 has an elongated shape and extends along a longitudinal direction LD of the cleaning tool 2100. The holder 2400 and the latch member 2500 extend along a direction substantially perpendicular to the longitudinal direction LD of the cleaning tool 2100 (short side direction SD of the cleaning tool 2100).

The longitudinal direction LD of the cleaning tool 2100 is a direction in which the cleaning tool 2100 is attached to and detached from the female connector C. That is, the longitudinal direction LD of the cleaning tool 2100 is perpendicular to the end surface of the ferrule F of the female connector C when the cleaning tool 2100 is attached to the female connector C. The short side direction SD of the cleaning tool 2100 is the longitudinal direction of the end surface of the ferrule F of the female connector C.

As described below, the operating portion 2600 includes a first end portion 2620 and a second end portion 2630 at an end along the longitudinal direction LD. The first end portion 2620 of the operating portion 2600 is independently present without being coupled to other members. The second end portion 2630 of the operating portion 2600 is coupled to the latch member 2500.

The latch member 2500 has a substantially rectangular parallelepiped shape, and the holder 2400 is formed so as to protrude from the surface opposite to the surface to which the second end portion 2630 of the operating portion 2600 is coupled. In the second embodiment, the holder 2400, the latch 2500, and the operating portion 2600 are integrally formed to constitute the cleaning tool 2100. Note that any one of the holder 2400, the latch 2500, and the operating portion 2600 may be configured to be detachable.

The operating portion 2600 has a substantially columnar shape. As illustrated in FIG. 8, the holder 2400, the latch 2500, and the operating portion 2600 are arranged such that the axis of the operating portion 2600 matches the centers of the holder 2400 and the latch 2500.

As described above, the cleaning tip 200 similar to the one in the first embodiment is used also in the cleaning tool 2100 according to the second embodiment. As illustrated in FIG. 8, a horizontal length of the cleaning tip 200 is H, a vertical length thereof is V, and a depth length thereof is D. The horizontal length H and a vertical length V of the cleaning tip 200 may be appropriately determined according to the size, or the like, of the end surface of the ferrule F of the female connector C. Moreover, the depth length D of the cleaning tip 200 is set to be longer than a depth GD (length of the groove 2430 along the longitudinal direction LD) of the groove 2430 of the holder 2400 described below. This configuration enables the cleaning tip 200 to protrude from the holder 2400 (refer to FIG. 9C) when the cleaning tip 200 is attached to the holder 2400. The protruding length of the cleaning tip 200 can be determined by the force with which the cleaning tip 200 presses the end surface of the ferrule F of the female connector C and the adhesion of the adhesive layer 220 when the cleaning tool 2100 is attached to the female connector C.

<<Holder 2400>>

The holder 2400 has a function of holding the cleaning tip 200. The holder 2400 has a groove structure having a substantially U-shaped cross section. The holder 2400 has two groove walls 2410 and a groove bottom 2420.

<Groove Wall 2410>

The two groove walls 2410 have substantially thin plate shapes. The groove bottom 2420 has a substantially rectangular parallelepiped shape. The two groove walls 2410 are erected on the groove bottom 2420 and extend away from the groove bottom 2420 substantially perpendicular to the groove bottom 2420. As illustrated in FIG. 8, the two groove walls 2410 extend along the longitudinal direction LD of the cleaning tool 2100. Furthermore, the two groove walls 2410 are arranged substantially parallel to each other and spaced apart from each other and extend along the short side direction SD of the cleaning tool 2100.

<Groove Bottom 2420>

The groove bottom 2420 is arranged substantially perpendicular to the two groove walls 2410. The groove 2430 is defined by the two groove walls 2410 and the groove bottom 2420. The cross section of the groove 2430 is substantially U-shaped due to the arrangement of the two groove walls 2410 and the groove bottom 2420. The cleaning tip 200 is arranged in the groove 2430.

<Attaching Cleaning Tip 200>

The two groove walls 2410 and the groove bottom 2420 have elongated shapes. The length of the two groove walls 2410 and the groove bottom 2420 in the longitudinal direction (short side direction SD of the cleaning tool 2100) is substantially the same as the horizontal length H of the cleaning tip 200 (length of the cleaning tip 200 in the longitudinal direction). As described above, the horizontal length H of the cleaning tip 200 may be appropriately determined according to the size, or the like, of the end surface of the ferrule F of the female connector C.

As described above, the two groove walls 2410 are erected on the groove bottom 2420, and include a tip end side 2440 at a position furthest away from the groove bottom 2420. The two groove walls 2410 are spaced apart from each other so as to arrange the tip end sides 2440 to be also spaced apart from each other. A holding opening 2450 is formed in a region sandwiched between the two tip end sides 2440. The cleaning tip 200 can be attached and detached via the holding opening 2450.

Figures 9A, 9B, 9C:
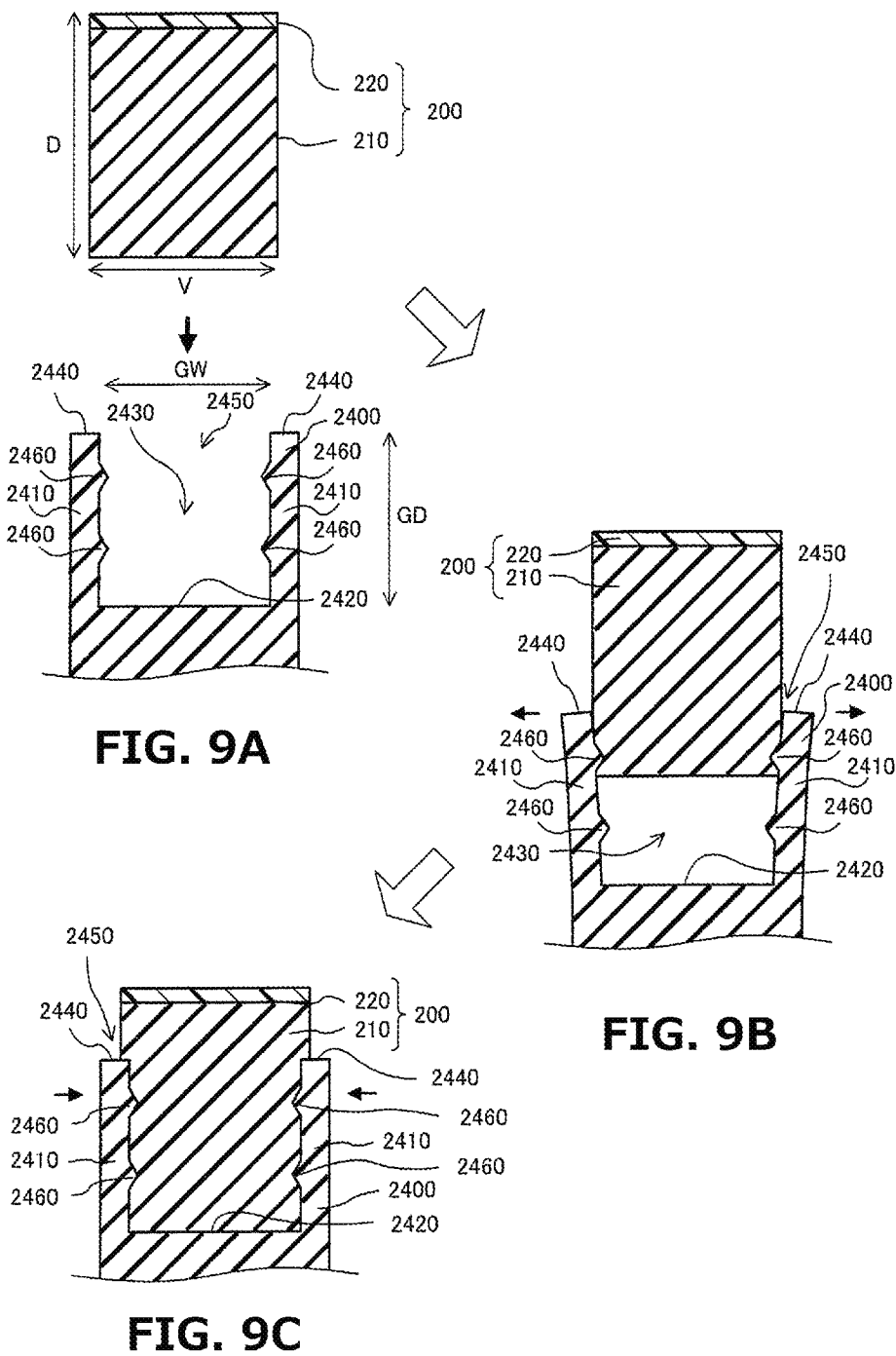
FIG. 9A is a cross-sectional view illustrating a state in which a cleaning tip 200 is brought closer to a holder 2400.
FIG. 9B is a cross-sectional view illustrating a state in which the cleaning tip 200 is brought further closer to the holder 2400 and the cleaning tip 200 is pushed into a portion between two groove walls 2410 via a holding opening 2450.
FIG. 9C is a cross-sectional view illustrating a state in which the cleaning tip 200 is attached to the holder 2400.

FIGS. 9A to 9C are cross-sectional views taken along line C-C in FIG. 8, being cross-sectional views illustrating a process of attaching the cleaning tip 200 to the holder 2400. FIG. 9A is a cross-sectional view illustrating a state in which the cleaning tip 200 is brought closer to the holder 2400. FIG. 9B is a cross-sectional view illustrating a state in which the cleaning tip 200 is further brought closer to the holder 2400 and the cleaning tip 200 is pushed into a portion between the two groove walls 2410 via the holding opening 2450.

The two groove walls 2410 are elastically deformed, and as illustrated in FIG. 9B, when the cleaning tip 200 is pushed into the portion between the two groove walls 2410, the two groove walls 2410 are elastically deformed (refer to the arrows in FIG. 9B), and the interval between the two groove walls 2410 is once widened. Note that the interval between the two groove walls 2410 (tip end side 2440) is GW when the two groove walls 2410 are not elastically deformed (refer to FIG. 9A). The interval GW between the two groove walls 2410 is slightly shorter than the vertical length V of the cleaning tip 200.

As illustrated in FIG. 9C, the cleaning tip 200 can be pushed in until it reaches the groove bottom 2420. In this manner, the cleaning tip 200 can be pushed into the portion between the two groove walls 2410 and attached to the holder 2400.

Elastic deformation of the two groove walls 2410 generates an elastic force (restoring force) in the groove wall 2410, so as to work on the two groove walls 2410 to return to the original shape (refer to an arrow in FIG. 9C). On the other hand, the cleaning tip 200 is similar to that of the first embodiment, and the buffer body 210 has elasticity. Therefore, when the elastic force of the groove wall 2410 is applied to the buffer body 210, the buffer body 210 is also elastically deformed. Elastic deformation of the buffer body 210 generates an elastic force (restoring force) also in the buffer body 210 so as to work on the buffer body 210 to return to its original shape. As described above, the interval GW between the two groove walls 2410 is slightly shorter than the vertical length V of the cleaning tip 200. Therefore, the elastic force generated in the two groove walls 2410 and the elastic force generated in the buffer body 210 act on each other so as to allow the cleaning tip 200 to be clamped by the two groove walls 2410 and held in the holder 2400.

Furthermore, as illustrated in FIGS. 9A to 9C, each of the two groove walls 2410 includes a plurality of ridges 2460 formed on the surfaces facing each other across the groove 2430. The plurality of ridges 2460 is formed so as to be parallel to each other and to protrude from the groove wall 2410. The plurality of ridges 2460 is formed along the longitudinal direction of the groove wall 2410 (short side direction SD illustrated in FIG. 8). When the cleaning tip 200 is arranged between the two groove walls 2410, the ridge 2460 bites into the buffer body 210 of the cleaning tip 200, and the cleaning tip 200 is fixed in a state of being bitten by the protrusion 2460 (biting lock).

In this manner, the cleaning tip 200 is stably held in the holder 2400 by being clamped by the two groove walls 2410 and by being bitten lock by the ridge 2460.

As described above, the depth length D of the cleaning tip 200 is longer than the depth GD of the groove 2430 of the holder 2400. When the cleaning tip 200 is attached to the holder 2400, the cleaning tip 200 protrudes from the tip end side 2440 of the holder 2400 (refer to FIG. 9C).

In particular, the relationship between the depth length D of the cleaning tip 200 and the depth GD of the groove 2430 of the holder 2400 is preferably such that the length of the cleaning tip 200 protruding from the tip end side 2440 of the holder 2400 is less than half the depth length D of the cleaning tip 200. That is, it is preferable that D−GD<D/2 is satisfied. With this configuration, it is possible to sufficiently generate the elastic force of the buffer body 210, and allow the adhesive layer 220 to come in close contact with the entire end surface of the ferrule F when the cleaning tool 2100 is attached to the female connector C.

Furthermore, it is preferable that the length of the cleaning tip 200 protruding from the tip end side 2440 of the holder 2400 is longer than one twentieth of the depth length D of the cleaning tip 200. With this configuration, it is possible to allow at least the adhesive layer 220 to protrude from the tip end side 2440 of the holder 2400, and the adhesive layer 220 to come in contact with the end surface of the ferrule F when the cleaning tool 2100 is attached to the female connector C.

While the above-described example is a case where the plurality of ridges 2460 is formed in each of the two groove walls 2410, it is not limited to the ridges but may be one or more projections. For example, the one or more projection may have a conical or triangular pyramidal shape. The ridges and projections may be any shape and any number thereof are suitable, as long as they can hold the buffer body 210.

<Detaching Cleaning Tip 200>

As described above, the two groove walls 2410 have substantially thin plate shapes and are erected on the groove bottom 2420, being arranged substantially in parallel spaced apart from each other. Therefore, two side surfaces 2470 positioned at both ends along the longitudinal direction of the two groove walls 2410 are not closed but are open. That is, a side gap 2480 having a substantially U-shaped cross section is formed on each of the two side surfaces 2470 (refer to FIG. 8).

When the cleaning tip 200 is attached to the holder 2400, the side surface of the cleaning tip 200 is positioned in the side gap 2480 and the buffer body 210 is exposed from the side gap 2480. Therefore, in detaching the cleaning tip 200 from the holder 2400, the side surface of the buffer body 210 of the cleaning tip 200 exposed from the side gap 2480 is hooked using an extraction auxiliary tool such as a pin so as to extract the cleaning tip 200 from the groove 2430. This makes it possible to easily detach the cleaning tip 200 from the holder 2400. In this manner, the side gap 2480 can be used in detaching the cleaning tip 200 from the holder 2400.

<Engaging Protrusion 2490>

The two side surfaces 2470 positioned at both ends along the longitudinal direction (short side direction SD illustrated in FIG. 8) of the holder 2400 includes an engaging protrusion 2490 formed integrally with the holder 2400. The engaging protrusion 2490 is formed along a direction substantially perpendicular to the longitudinal direction LD of the cleaning tool 2100.

The engaging protrusion 2490 has a substantially triangular prism shape and includes two slopes 2492A and 2492B. The engaging protrusion 2490 has a border edge 2494 at a border between the two slopes 2492A and 2492B (refer to FIGS. 8, 10A, 10B, 11A, and 11B). The border edge 2494 is a side that is the furthest away from the side surface 2470 in the engaging protrusion 2490. That is, the engaging protrusion 2490 is formed on the side surface 2470 of the groove bottom 2420 such that the border edge 2494 protrudes most from the side surface 2470.

The engaging protrusion 2490 is formed adjacent to an engaging opening 2520 described below. The engaging protrusion 2490 is formed so as to protrude from the side surface 2470, and the engaging protrusion 2490 is arranged so as to interfere with a portion of the engaging opening 2520 by the two slopes 2492A and 2492B.

<Latch 2500>

As illustrated in FIG. 8, the holder 2400 is provided so as to protrude from the latch 2500 along the longitudinal direction LD of the cleaning tool 2100. In the second embodiment, the holder 2400 is formed integrally with the latch 2500. The holder 2400 may be configured to be detachable from the latch 2500. With a detachable configuration, it is possible to suitably select and replace the suitable holder 2400 appropriately in accordance with the shape and size of the opening N of the female connector C, the shape and size of the cleaning tip 200, or the like.

The latch 2500 has a substantially rectangular parallelepiped shape. Engaging groove portions 2510 are formed on two side surfaces 2470 positioned at both ends along the longitudinal direction (short side direction SD illustrated in FIG. 8) of the latch 2500. The engaging groove portion 2510 is formed along the longitudinal direction LD of the cleaning tool 2100 and has a substantially U-shaped cross section. The engaging groove portion 2510 includes an engaging opening 2520 and an engaging terminal 2530. The engaging opening 2520 is positioned on the holder 2400 side, while the engaging terminal 2530 is positioned on the operating portion 2600 side.

As described below, the engaging opening 2520 is an opening for housing the engaging projection E of the female connector C in the engaging groove portion 2510 (refer to FIGS. 10A, 10B, 11A, 11B, and 12A to 12D). The engaging groove portion 2510 is a groove for guiding the engaging projection E of the female connector C from the engaging opening 2520 to the engaging terminal 2530. The engaging terminal 2530 is a wall surface for locking the engaging projection E of the female connector C. That is, the engaging projection E of the female connector C is inserted into the engaging groove portion 2510 via the engaging opening 2520, and is guided by the engaging groove portion 2510 so as to be locked by the engaging terminal 2530.

As described above, the engaging protrusion 2490 is positioned adjacent to the engaging opening 2520, and when the cleaning tool 2100 is attached to the female connector C, the engaging projection E of the female connector C is stored in the engaging groove portion 2510 and is engaged with both the engaging protrusion 2490 and the engaging terminal 2530, stably maintaining the latch state of the cleaning tool 2100.

<Operating Portion 2600>

As illustrated in FIG. 8, the operating portion 2600 protrudes from the latch 2500 in a direction opposite to the holder 2400. The operating portion 2600 has an elongated and substantially columnar shape. The operating portion 2600 has a substantially fixed diameter. The diameter (thickness) and the length in the longitudinal direction of the operating portion 2600 may be determined appropriately to levels easily gripped by human fingers. In addition, the shape of the operating portion 2600 need not be substantially columnar, and may be any shape as long as it can be easily gripped by human fingers.

An anti-slip 2610 is formed in the middle of the operating portion 2600 in the longitudinal direction. The anti-slip 2610 has a substantially annular shape and includes a plurality of annular portions surrounding the operating portion 2600. The annular portion is slightly thicker than the thickness of the anti-slip 2610. The anti-slip 2610 need not be an annular shape and may be anything as long as it suppresses slipping such as increasing contact area with human fingers or increasing resistance force. For example, irregularities may be formed, or a resin such as rubber may be provided.

<<<Attaching Cleaning Tool 2100>>>

FIGS. 10A and 10B, FIGS. 11A and 11B, and FIGS. 12A to 12D are diagrams illustrating a process of attaching the cleaning tool 2100 to the female connector C. FIGS. 10A, 10B, 11A, and 11B are cross-sectional views taken along line A-A illustrated in FIG. 8. FIGS. 12A to 12D are cross-sectional views taken along line B-B illustrated in FIGS. 10A, 10B, 11A, and 11B.

<Protruding Piece L and Engaging Projection E>

As illustrated in FIGS. 10A, 10B, 11A, and 11B, the female connector C includes two protruding pieces L spaced apart from each other formed along the attachment-detachment direction of the male connector so as to sandwich a region CA (hereinafter referred to as a male connector arrangement region CA) in which a male connector (not illustrated) is to be arranged. In the second embodiment, the holder 2400 and the latch 2500 are arranged in the male connector arrangement region CA.

The two protruding pieces L have elongated shapes along the attachment-detachment direction of the male connector. The two protruding pieces L are made of a material such as an elastically deformable resin. The two protruding pieces L can be displaced so as to come away from or closer to each other due to elastic deformation.

The engaging projections E are formed at the end portions of the two protruding pieces L such that protruding portions thereof face each other. As illustrated in FIGS. 10A, 10B, 11A, and 11B, the engaging projection E has a polygonal cross-sectional shape which is close to a trapezoid. The engaging projection E mainly includes a tip end surface ET, a front slope FS, an intermediate surface MS, and a rear slope RS.

The tip end surface ET is a surface positioned at a tip end of the protruding piece L and is formed along the direction substantially perpendicular to the longitudinal direction of the protruding piece L. The front slope FS and the rear slope RS are surfaces formed diagonally with respect to the longitudinal direction of the protruding pieces L. The inclination of the front slope FS and the rear slope RS are opposite to each other in the longitudinal direction of the protruding piece L. The intermediate surface MS is a surface arranged between the front slope FS and the rear slope RS and is formed along the longitudinal direction of the protruding piece L.

Figure 11A:
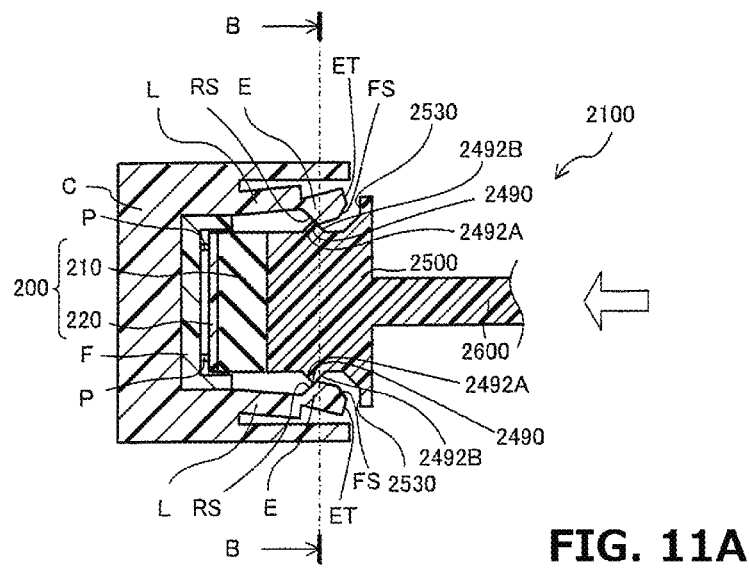
FIGS. 11A and 11B are views illustrating a process of attaching the cleaning tool 2100 to the female connector C.
Figure 11B:
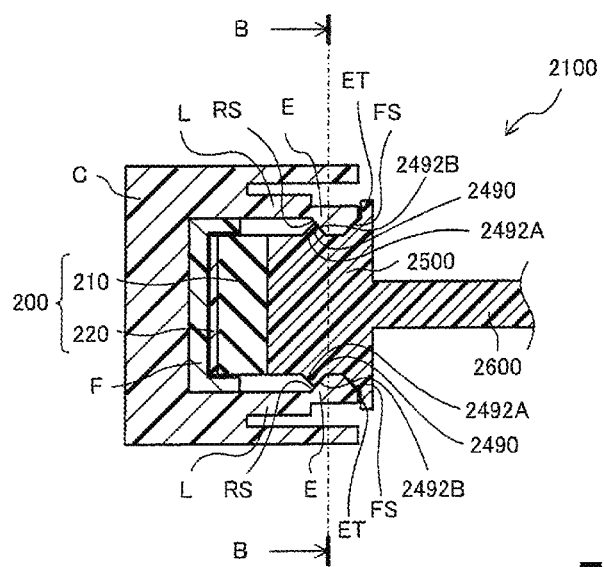

As illustrated in FIG. 11B, the holder 2400 and the latch 2500 of the cleaning tool 2100 are arranged in the male connector arrangement region CA. That is, the holder 2400 and the latch 2500 of the cleaning tool 2100 are arranged between the two protruding pieces L.

<Before Insertion of Cleaning Tool 2100>

Figure 10A:
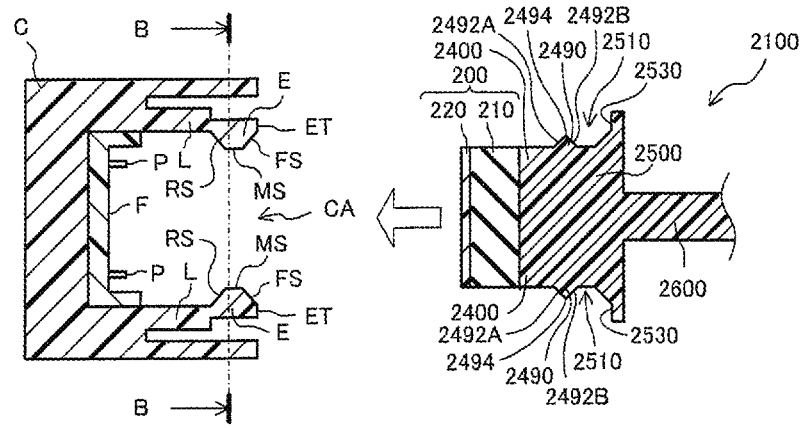
FIGS. 10A and 10B are views illustrating a process of attaching the cleaning tool 2100 to a female connector C.

FIGS. 10A and 12A are diagrams illustrating a process in which the cleaning tool 2100 is brought closer to the female connector C. The cleaning tip 200 is attached to the holder 2400 of the cleaning tool 2100 beforehand, and the cleaning tool 2100 is brought close to the female connector C so as to allow the adhesive layer 220 of the cleaning tip 200 to face the ferrule F of the female connector C. In this state, none of the members of the cleaning tool 2100 is in contact with members of the female connector C.

<Before Passing the Border Edge 2494 of Engaging Protrusion 2490>

Figure 10B:
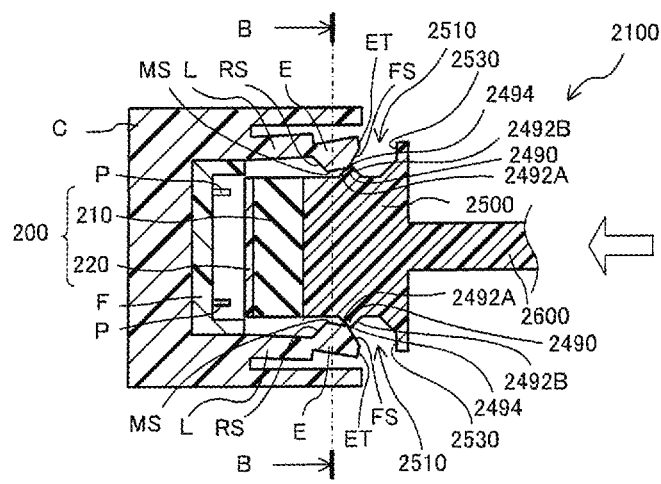

FIGS. 10B and 12B are diagrams illustrating a state in which the cleaning tool 2100 is inserted in the female connector C to some extent.

The cleaning tool 2100 is inserted into the female connector C while maintaining a state in which the adhesive layer 220 of the cleaning tip 200 faces the ferrule F of the female connector C. When the cleaning tool 2100 is further inserted toward the ferrule F, the front slope FS of the engaging projection E first comes in contact with the slope 2492A of the engaging protrusion 2490.

When the cleaning tool 2100 is further inserted toward the ferrule F, the engaging projection E is pressed by the slope 2492A of the engaging protrusion 2490 to cause the two protruding pieces L to be elastically deformed, so as to displace the engaging projections E to be separated from each other. The state illustrated in FIGS. 10B and 12B is a state in which the engaging projection E is pressed by the slope 2492A, and the two protruding pieces L are elastically deformed to cause the engaging projections E to be separated from each other.

In the state illustrated in FIGS. 10B and 12B, the front slope FS of the engaging projection E is still in contact with the border edge 2494. The intermediate surface MS of the engaging projection E has not passed through the border edge 2494.

<After Passing Border Edge 2494 of Engaging Protrusion 2490>

FIGS. 11A and 12C are diagrams illustrating a process in which the cleaning tool 2100 is brought close to the ferrule F of the female connector C.

When the cleaning tool 2100 is further inserted toward the ferrule F, the intermediate surface MS of the engaging projection E passes through the border edge 2494, and thereafter, the rear slope RS of the engaging protrusion 2490 comes in contact with the slope 2492B. In this state, the engaging projection E is pressed by the slope 2492B of the engaging protrusion 2490 to cause the two protruding pieces L to be elastically deformed, displacing the engaging projections E so as to separate from each other. The state illustrated in FIGS. 11A and 12C is a state in which the engaging projection E is pressed by the slope 2492B, and the two protruding pieces L are elastically deformed to cause the engaging projections E to be separated from each other.

Furthermore, as illustrated in FIGS. 11A and 12C, the cleaning tip 200 (buffer body 210 and adhesive layer 220) is pierced by two guide pins P of the ferrule F of the female connector C, leading to a state in which the two guide pins P are inserted into the buffer body 210.

<Completion of Engaged State>

FIGS. 11B and 12D are diagrams illustrating a state in which the adhesive layer 220 of the cleaning tip 200 of the cleaning tool 2100 is in contact with the ferrule F of the female connector C.

When the cleaning tool 2100 is further inserted toward the ferrule F, the piercing by the two guide pins P proceeds, and finally, the adhesive layer 220 of the cleaning tip 200 comes into contact with the ferrule F of the connector C.

Moreover, the intermediate surface MS of the engaging projection E passes through the slope 2492B, and the engaging projection E is stored in the engaging groove portion 2510. The tip end surface ET of the engaging projection E is locked by the engaging terminal 2530 of the engaging groove portion 2510. Moreover, the rear slope RS of the engaging projection E is locked by the slope 2492B of the engaging protrusion 2490. In this manner, the engaging projection E is held in the engaging groove portion 2510 by the locking of both the engaging protrusion 2490 and the engaging terminal 2530. In this manner, by holding the engaging projection E in the engaging groove portion 2510, the cleaning tool 2100 can be positioned at a fixed position with respect to the female connector C.

The fixed position where the cleaning tool 2100 is positioned with respect to the female connector C is a position where the adhesive layer 220 can reach the root of the two guide pins P. By positioning the cleaning tool 2100 at a fixed position with respect to the female connector C, it is not merely possible to press the adhesive layer 220 against the end surface of the ferrule F with a fixed force, but also possible to allow the adhesive layer 220 to come in close contact with the entire end surface of the ferrule F without generating any gap between the adhesive layer 220 and the end surface of the ferrule F.

In this manner, by causing the adhesive layer 220 to reach the root of the two guide pins P, it is possible to attract the dust on the entire end surface of the ferrule F with the adhesion of the adhesive layer 220. The dust adheres to the end surface of the ferrule F by electrostatic force, or the like. It is possible to also remove dust adhering to the surroundings of the two guide pins P and the outside of the two guide pins P with the adhesion of the adhesive layer 220.

Furthermore, by locking the engaging projection E on both the engaging protrusion 2490 and the engaging terminal 2530, it is possible to constantly apply the adhesion of the adhesive layer 220 over the entire surface of the end surface of the ferrule F. Accordingly, the adhesive layer 220 can always be brought into close contact with the entire end surface of the ferrule F regardless of the operator's degree of power adjustment, habit, proficiency, or the like. The contact state of the adhesive layer 220 with the end surface of the ferrule F can be made constant by any operator and dust can be stably removed.

When detaching the cleaning tool 2100 from the female connector C, a force is applied to the cleaning tool 2100 to be spaced apart the engaging projection E from the engaging groove portion 2510 so as to get over the border edge 2494 of the engaging protrusion 2490. For example, by applying a force in the diagonal direction to the cleaning tool 2100 with respect to the moving direction of the cleaning tool 2100, it is possible to displace the protruding piece L and easily release the engagement between the engaging projection E and the engaging groove portion 2510.

Third Embodiment

The cleaning tool 2100 of the second embodiment described above is a case where the shape of the holding opening 2450 of the holder 2400 is substantially rectangular, and the two groove walls 2410 are formed along the long side of the holding opening 2450. The groove wall is not limited thereto, and the groove wall may be formed along the short side of the holding opening.

Figures 13A, 13B:
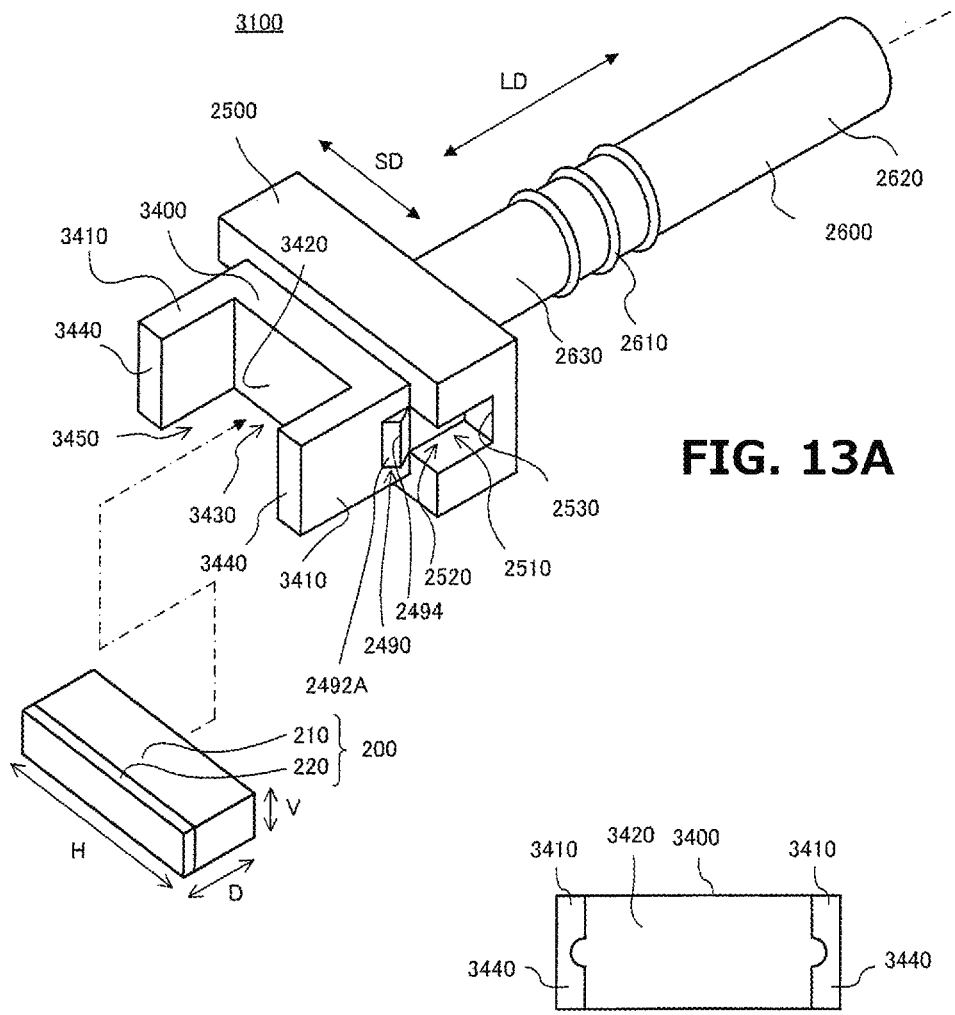
FIG. 13A is a perspective view illustrating an entire configuration of a cleaning tool 3100 according to a third embodiment and FIG. 13B is a front view illustrating a holder 3400.

FIG. 13A is a perspective view illustrating an entire configuration of a cleaning tool 3100 according to a third embodiment. The structure of the holder 3400 of the cleaning tool 3100 is different from the structure of the holder 2400 of the cleaning tool 2100 of the second embodiment. In the third embodiment, members having a similar structure and function as those of the cleaning tool 2100 of the second embodiment are denoted by the same reference numerals.

<<Holder 3400>>

Similarly to the holder 2400, the holder 3400 has a function of holding the cleaning tip 200. The holder 3400 has a groove structure having a substantially U-shaped cross section. The holder 3400 has two groove walls 3410 and a groove bottom 3420. The shape of a holding opening 3450 of the holder 3400 is substantially rectangular.

<Groove Wall 3410>

As illustrated in FIG. 13A, the two groove walls 3410 are formed along the short side of the holding opening 3450 having a substantially rectangular shape.

The two groove walls 3410 have substantially thin plate shapes. The two groove walls 3410 are erected on the groove bottom 3420 and extend away from the groove bottom 3420 substantially perpendicular to the groove bottom 3420. That is, the two groove walls 3410 extend along the longitudinal direction LD of the cleaning tool 3100. Furthermore, the two groove walls 3410 face to and are spaced apart from each other and are arranged substantially parallel to each other, and extend along the short side of the holding opening 3450.

A groove 3430 is formed by a gap formed by the two groove walls 3410 and the groove bottom 3420. The two groove walls 3410 are erected on the groove bottom 3420, and include a tip end side 3440 at a position furthest away from the groove bottom 3420. A holding opening 3450 is formed in a region between the tip end sides 3440 of the two groove walls 3410. The cleaning tip 200 can be attached and detached via the holding opening 3450.

As described above, the two groove walls 3410 are formed on the short sides of the holding opening 3450. With this arrangement, it is possible to increase the interval between the two groove walls 3410 so as to open the long side of the holding opening 3450. This can increase the portion where the cleaning tip 200 is exposed to the long side of the holding opening 3450, making it possible to facilitate attachment-detachment operation of the cleaning tip 200.

As described in the first embodiment, the female connector C is configured such that the two guide pins P protrude from the ferrule F. Therefore, the thickness of the two groove walls 3410 may be determined so as not to allow the two groove walls 3410 to obstruct the guide pin P when the cleaning tool 3100 is attached to the female connector C.

Moreover, as illustrated in FIG. 13B, the shape of the groove wall 3410 may be a shape that can evade the guide pin P. FIG. 13B is a front view illustrating the holder 3400. By forming the substantially semi-columnar shape region with the guide pin P as the central axis into a non-formation region where the groove wall 3410 is not formed, it is possible to prevent interference of the groove wall 3410 with the guide pin P in attaching the cleaning tool 3100 to the female connector C. The shape of the non-formation region may be appropriately determined in accordance with the thickness of the groove wall 3410 and the size of the non-formation region.

Fourth Embodiment

Moreover, similarly to the first embodiment, the cleaning tip 200 may be surroundingly supported. Since the cleaning tip 200 is surroundingly supported by the wall surfaces formed in four directions, it is possible to stably hold the cleaning tip 200.

Figures 14A, 14B:
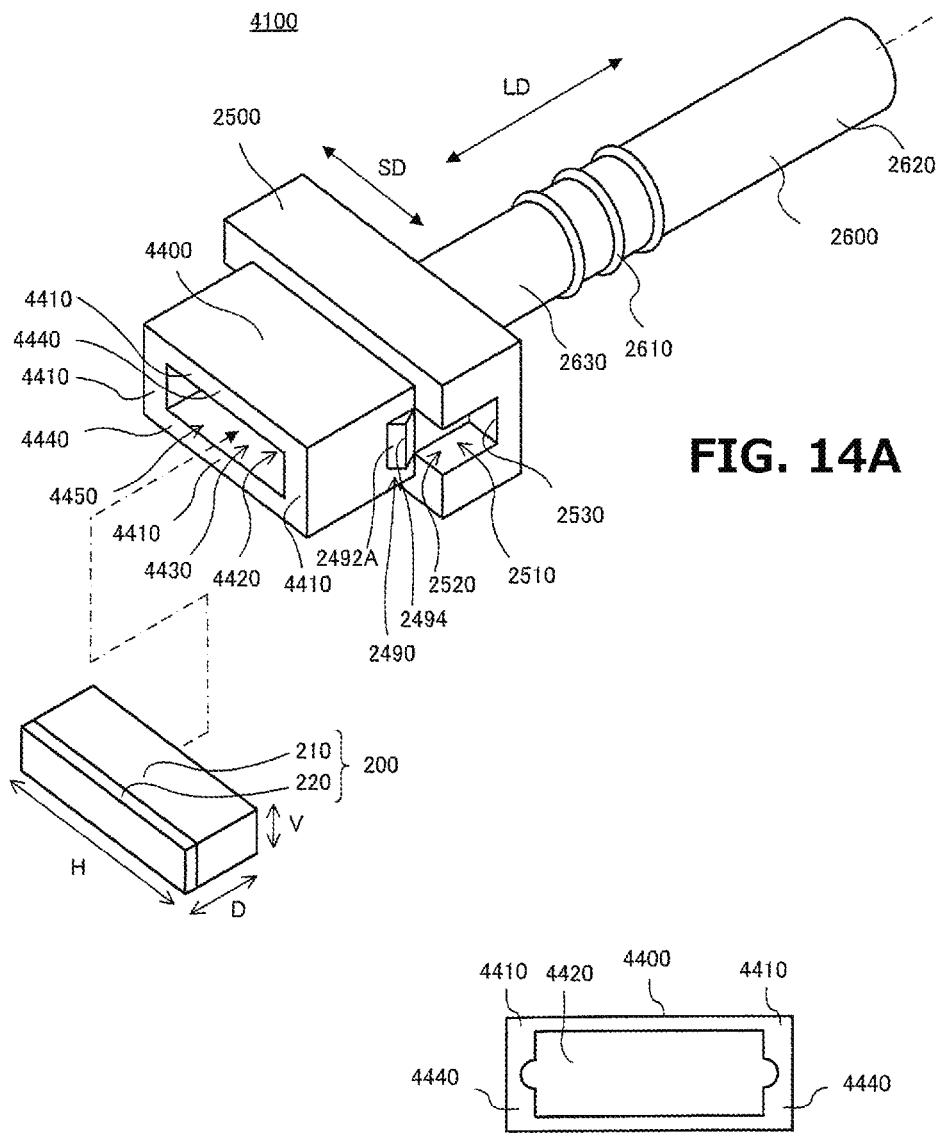
FIG. 14A is a perspective view illustrating an entire configuration of a cleaning tool 4100 according to a fourth embodiment and FIG. 14B is a front view illustrating a holder 4400.

FIG. 14A is a perspective view illustrating an entire configuration of a cleaning tool 4100 according to a fourth embodiment. The structure of a holder 4400 of the cleaning tool 4100 is different from the holder 2400 of the cleaning tool 2100 of the second embodiment and from the holder 3400 of the cleaning tool 3100 of the third embodiment. In the fourth embodiment, members having a similar structure and function as those of the cleaning tool 2100 of the second embodiment and the cleaning tool 3100 of the third embodiment are denoted by the same reference numerals.

<<Holder 4400>>

Similarly to the holder 2400 and the holder 3400, the holder 4400 has a function of holding the cleaning tip 200. The holder 4400 includes four side walls 4410 and a groove bottom 4420. The four side walls 4410 have substantially rectangular tubular shapes. The shape of a holding opening 4450 of the holder 4400 is substantially rectangular.

<Side Wall 4410>

As illustrated in FIG. 14A, the four side walls 4410 have substantially rectangular tubular shapes and are formed along the holding opening 4450 having a substantially rectangular shape.

The four side walls 4410 have substantially thin plate shapes. The four side walls 4410 are erected on the groove bottom 4420 and extend away from the groove bottom 4420 substantially perpendicular to the groove bottom 4420.

A groove 4430 is formed by a gap formed by the four side walls 4410. The four side walls 4410 are erected on the groove bottom 4420, and include a tip end side 4440 at a position most distant from the groove bottom 4420. The holding opening 4450 is formed in a region between the tip end sides 4440 of the four side walls 4410. The cleaning tip 200 can be attached and detached via the holding opening 4450.

As described above, since the cleaning tip 200 is surroundingly supported by the four side walls 4410, the cleaning tip 200 can be stably held.

The two guide pins P are provided so as to protrude from the ferrule F. Therefore, the thickness of the side walls 4410 may be determined so as not to allow the side walls 4410 to obstruct the guide pin P.

Moreover, as illustrated in FIG. 14B, the shape of the side wall 4410 may be a shape that can evade the guide pin P. FIG. 14B is a front view illustrating the holder 4400. By forming the substantially semi-columnar shape region with the guide pin P as the central axis into a non-formation region where the side wall 4410 is not formed, it is possible to prevent interference of the side wall 4410 with the guide pin P when the cleaning tool 4100 is attached to the female connector C. The shape of the non-formation region may be appropriately determined in accordance with the thickness of the side wall 4410 and the size of the non-formation region.

Fifth Embodiment

In the above example, the entire portion of at least one of the long side and the short side of the cleaning tip 200 is clamped. However, it is sufficient that at least a portion of one of the long side and the short side of the cleaning tip 200 is clamped as long as the cleaning tip 200 can be held.

Figure 15:
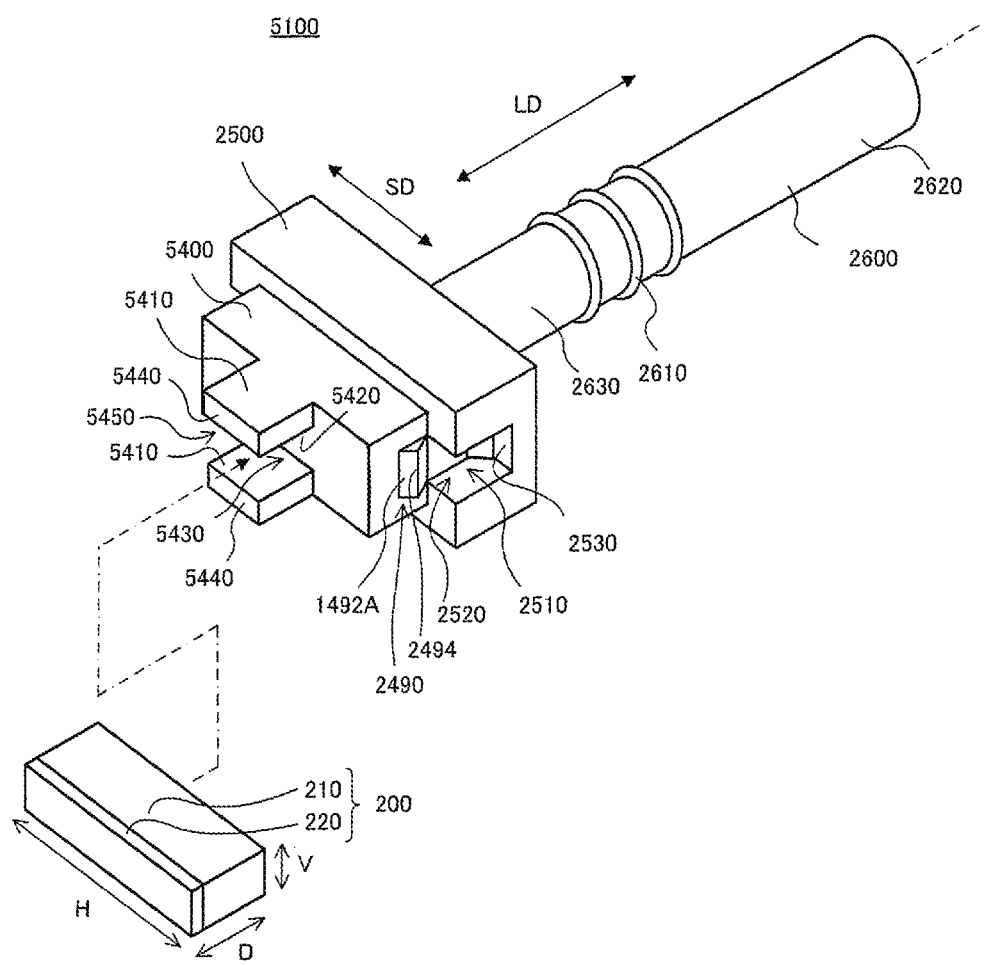
FIG. 15 is a perspective view illustrating am entire configuration of a cleaning tool 5100 according to a fifth embodiment.

FIG. 15 is a perspective view illustrating an entire configuration of a cleaning tool 5100 according to a fifth embodiment. As illustrated in FIG. 15, a groove wall 5410 of a holder 5400 of the cleaning tool 5100 is formed to be shorter than the groove wall 2410 of the holder 2400 of the cleaning tool 2100 of the second embodiment. In the fifth embodiment, members having a similar structure and function as those of the cleaning tool 2100 of the second embodiment are denoted by the same reference numerals.

A groove 5430 is formed by a gap formed by the two groove walls 5410 and a groove bottom 5420. The two groove walls 5410 are erected on the groove bottom 5420, and have a tip end side 5440 at a position furthest away from the groove bottom 5420. A holding opening 5450 is formed in a region between the tip end sides 5440 of the two groove walls 5410. The cleaning tip 200 can be attached and detached via the holding opening 5450.

The elastic force needed for clamping the cleaning tip 200 may preferably be generated by appropriately selecting the material of the holder 5400, the thickness of the groove wall 5410, or the like.

Similarly, it is possible to adopt a structure in which a portion of the short side of the cleaning tip 200 is clamped, or a structure in which both a portion of the long side and a portion of the short side of the cleaning tip 200 are clamped (not illustrated). In either case, the elastic force needed for clamping the cleaning tip 200 may preferably be generated by appropriately selecting the material of the holder 5400, the thickness of the groove wall 5410, or the like.

Outline of Second to Fifth Embodiments

Eighth Embodiment

According to an eighth embodiment of the present invention, there provided is a connector cleaning tool including: a buffer body (for example, the buffer body 210 of the cleaning tip 200); an adhesive body (for example, the adhesive layer 220 of the cleaning tip 200) arranged with the buffer body; and a holder (for example, the holder 2400, 3400, 4400, or 5400) including at least one pair of holding pieces (for example, the groove wall 2410), the at least one pair of holding pieces facing each other across a gap (for example, the groove 2430, 3430, 4430, or 5430), the at least one pair of holding pieces being configured to detachably hold the buffer body arranged in the gap, in which in a case where the connector cleaning tool is pressed toward the connection end surface (for example, end surface of the ferrule F described below) of the connector (for example, a connector C described below) on which the guide pin (for example, the guide pin P described below) is protrudingly provided, the guide pin is inserted into the buffer body via the adhesive body.

The connector cleaning tool includes the buffer body and the adhesive body provided on the buffer body. A guide pin is protrudingly provided on the connection end surface of the connector, and in a case where the connector cleaning tool is pressed toward the connection end surface of the connector, the guide pin can be inserted into the buffer body via the adhesive body.

Furthermore, the connector cleaning tool may include the holder. The holder may include at least one pair of holding pieces. The at least one pair of holding pieces faces each other across a gap. The buffer body is arranged in the gap. The at least one pair of holding pieces detachably holds the buffer body arranged in the gap. It is sufficient that the pair of holding pieces is able to detachably hold the buffer body, and it is sufficient that it can come in contact with and hold at least a portion of the buffer body regardless of the shape and size of the at least one pair of holding pieces.

The buffer body is provided with the adhesive body. When the buffer body is held by the pair of holding pieces, the adhesive body is arranged so as to be directed away from the holder. In particular, it is preferable that the adhesive body is arranged at a position farthest from the holder. Specifically, it is preferable that the adhesive body and a portion of the buffer body protrude in a direction away from the holder. By causing the adhesive body and a portion of the buffer body to protrude from the holder, the adhesive body can be brought into close contact with the connection end surface of the connector. In particular, by pressing the buffer body that partly protrudes from the holder against the connection end surface of the connector via the adhesive body, the buffer body is elastically deformed. In addition, the elastic force of the buffer body can serve to increase the degree of closeness of contact of the adhesive body to the connection end surface of the connector, and to bring the adhesive body into close contact with the entire connection end surface of the connector.

As described above, the holder may include at least one pair of holding pieces. That is, the holder may include a plurality of pairs of holding pieces. The number of pairs is not limited as long as it can detachably hold the buffer body. In the case where the holder includes the plurality of pairs of holding pieces, adjacent pairs of holding pieces may be arranged side by side so as to be spaced apart from each other, or arranged such that the adjacent pairs of holding pieces come in contact with each other. In the case where the adjacent pairs of holding pieces are arranged to be spaced apart from each other, it is possible to facilitate attachment-detachment of the buffer body (cleaning tip 200) by using the gap. Meanwhile in a case where the adjacent pairs of holding pieces are arranged to be in contact with each other, it is possible to increase the area that can be brought into contact with the buffer body (cleaning tip 200), so that the buffer body (cleaning tip 200) is stably held.

In this manner, by detachably holding the buffer body with at least one pair of holding pieces, it is possible to easily replace the buffer body, and the work efficiency can be enhanced. Moreover, even in a case where the adhesion of the adhesive body is lowered in continuous use of the connector cleaning tool, the buffer body can be replaced immediately, and it is possible to keep the connection end surface constantly clean by cleaning the connection end surface with the adhesive body having high adhesion.

It is sufficient that the holder includes at least one pair of holding pieces and the at least one pair of holding pieces comes in contact with at least a portion of the buffer body and hold it, and the holder may include a region not being in contact with the buffer body.

That is, the holder (for example, the holders 2400, 3400, 4400, or 5400) includes: at least one pair of holding pieces (for example, the groove wall 2410), the pair of holding pieces facing each other across the gap (for example, the grooves 2430, 3430, 4430, or 5430), the pair of holding pieces being configured to detachably hold the buffer body arranged in the gap; and a non-contact region (such as a side gap 2480) connected to the at least one pair of holding pieces and configured to be not in contact with the buffer body.

With such a configuration, even when the buffer body is held by the holding piece, the non-contact region (for example, the side gap 2480) does not come in contact with the buffer body, and the buffer body is exposed to come in an open state in the non-contact region. In this manner, even in a state where the buffer body is held by the holding piece, a portion of the buffer body is exposed from the holder in the non-contact region. This makes it easier to bring the extraction auxiliary tool such as a pin into contact with the buffer body in the non-contact region, facilitating the operation of detaching the buffer body (for example, the cleaning tip 200).

While the cleaning tip 200 is handled as disposable or reusable in general, in any case, in a case where the adhesion of the adhesive body provided on the buffer body of the cleaning tip 200 is lowered, the cleaning tip 200 needs to be replaced. As described above, by forming the non-contact region in the holder, it is possible to facilitate replacement operation of the cleaning tip 200 by using an extraction auxiliary tool such as a pin.

The non-contact region may be substantially U-shaped such as the side gap 2480 (refer to FIG. 8). That is, the non-contact region can be an opening having an elongated shape with one end of an elongated opening opened and the other end being closed. Opening one end facilitates extraction of the cleaning tip 200, and closing the other end makes it possible to maintain the contact state with the buffer body.

Moreover, the opening serving as the non-contact region may be any shape as long as the surface of the buffer body is exposed from the opening, including the shape having no open end portion, for example, a shape having a closed contour such as a circle, an ellipse, and a polygon. Having no open end portion makes it possible to allow the entire holder to be coupled with each other and increase the rigidity of the holder, facilitating the detachment of the cleaning tip 200 while stably holding the buffer body.

Furthermore, as described above, in the case where there is a plurality of pairs of holding pieces, it is possible to arrange such that adjacent pairs of holding pieces are arranged side by side so as to be spaced apart from each other. It is sufficient that each of the pairs of holding pieces can come in contact with at least a portion of the buffer body and hold it.

That is, the holder includes: a plurality of pairs of holding pieces (for example, the groove wall 2410), adjacent pairs of holding pieces being arranged to be spaced apart from each other, each of the pairs of holding pieces facing each other across a gap (for example, the groove 2430, 3430, 4430, or 5430), each of the pairs of holding pieces being configured to detachably hold the buffer body arranged in the gap; and a non-contact region formed between the adjacent pairs of holding pieces and configured to be not in contact with the buffer body.

With such a configuration, even when the buffer body is held by all the plurality of pairs of holding pieces, the non-contact region does not come in contact with the buffer body, and the buffer body is exposed from a portion between the adjacent pairs of holding pieces to be in an open state in the non-contact region. In this manner, even in a state where the buffer body is held by the plurality of pairs of holding pieces, a portion of the buffer body is exposed in the non-contact region. This makes it easier to bring the extraction auxiliary tool such as a pin into contact with the buffer body in the non-contact region, facilitating the operation of detaching the buffer body (for example, the cleaning tip 200).

Ninth Embodiment

A ninth embodiment of the present invention according to the eighth embodiment of the present invention further includes an engaging groove (for example, the engaging groove portion 2510) for storing protruding pieces (for example, the protruding pieces L of the female connector C) provided across the connection end surface.

In this manner, since the protruding piece is stored in the engaging groove, it is possible to guide the connector cleaning tool to the connector by following a fixed path.

Tenth Embodiment

A tenth embodiment of the present invention according to the ninth embodiment of the present invention further includes: an engaging protrusion (for example, the engaging protrusion 2490) for locking the engaging projection (for example, the engaging projection E of the female connector C) provided at the end portion of the protruding piece; and an engaging terminal (for example, the engaging terminal 2530) adjacent to the engaging groove.

Since the engaging projection is locked by the engaging protrusion and the engaging terminal, it is possible to arrange the connector cleaning tool at a fixed position on the connector and to bring the adhesive body into close contact with the entire connection end surface by pressing the adhesive body against the connection end surface with a fixed force.

Eleventh Embodiment

An eleventh embodiment of the present invention according to the eighth embodiment of the present invention further includes a holder (for example, the ridge 2460) formed to face each other and configured to press and hold the buffer body.

With the holder, it is possible to stably hold the buffer body in the holder.

REFERENCE SIGNS LIST

100 Cleaning tool
200 Cleaning tip
210 Buffer body
220 Adhesive layer (adhesive body)
300 Tool main body
310 Casing
320 Holder (holding member)
330 Support
340 Through hole
360 Latch member
350 Movable body
2100, 3100, 4100, 5100 Cleaning tool
2400, 3400, 4400, 5400 Holder
2410, 3410, 5410 Groove wall
4410 Side wall
2430 Groove portion
2510 Engaging groove portion
2490 Engaging protrusion
2530 Engaging terminal
2460 Ridge
C Female connector
F Ferrule
P Guide pin
N Opening
L Protruding piece
E Engaging projection

The invention claimed is:
1. A connector cleaning tool comprising:
a buffer body; and an adhesive body arranged with the buffer body;

a holder having a first holder opening, a second holder opening apart from the first holder opening, and a locking part, the buffer body being fitted into the first holder opening; and a movable body being configured to push out the buffer body from the holder, wherein when the connector cleaning tool is pressed toward a connection end surface of a connector on which a guide pin is protrudingly provided, the connector cleaning tool is configured to allow the guide pin to be inserted into the buffer body via the adhesive body, and wherein when the movable body moves to the second holder opening, the movable body is locked to the locking part.

2. The connector cleaning tool according to claim 1, wherein the connector further comprises a housing having an opening, wherein the housing is configured to house the connection end surface, and wherein the connector cleaning tool is configured to be inserted from the opening so as to allow the buffer body and the adhesive body to move toward the connection end surface.

3. The connector cleaning tool according to claim 1, wherein the connection end surface is an end surface for connecting an optical fiber.

4. The connector cleaning tool according to claim 1, wherein the holder detachably holds the buffer body and the adhesive body.

5. The connector cleaning tool according to claim 1, wherein the holder integrally holds the buffer body and the adhesive body.

6. The connector cleaning tool according to claim 2, further comprising a latch member, wherein the latch member can be latched on the housing, and wherein the latch member holds a state in which the adhesive body is in contact with the connection end surface when the latch member is latched on the housing.

7. The connector cleaning tool according to claim 1, wherein the buffer body has a Shore A hardness of 10 to 80.

8. The connector cleaning tool according to claim 2, wherein the connection end surface is an end surface for connecting an optical fiber.

9. The connector cleaning tool according to claim 2, further comprising a holding member configured to detachably hold the buffer body and the adhesive body.

10. The connector cleaning tool according to claim 3, further comprising a holding member configured to detachably hold the buffer body and the adhesive body.

11. The connector cleaning tool according to claim 8, further comprising a holding member configured to detachably hold the buffer body and the adhesive body.

12. The connector cleaning tool according to claim 2, further comprising a holding member configured to integrally hold the buffer body and the adhesive body.

13. The connector cleaning tool according to claim 3, further comprising a holding member configured to integrally hold the buffer body and the adhesive body.

14. The connector cleaning tool according to claim 8, further comprising a holding member configured to integrally hold the buffer body and the adhesive body.

* * * * *